United States Patent
Tateishi et al.

(10) Patent No.: US 11,270,718 B2
(45) Date of Patent: Mar. 8, 2022

(54) SIGNAL PROCESSING APPARATUS AND SIGNAL PROCESSING METHOD

(71) Applicant: SONY CORPORATION, Tokyo (JP)

(72) Inventors: Kazuya Tateishi, Tokyo (JP); Shusuke Takahashi, Chiba (JP); Akira Takahashi, Saitama (JP); Kazuki Ochiai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/766,284

(22) PCT Filed: Sep. 18, 2018

(86) PCT No.: PCT/JP2018/034411
§ 371 (c)(1),
(2) Date: May 21, 2020

(87) PCT Pub. No.: WO2019/106914
PCT Pub. Date: Jun. 6, 2019

(65) Prior Publication Data
US 2021/0264934 A1   Aug. 26, 2021

(30) Foreign Application Priority Data
Nov. 30, 2017   (JP) .............................. JP2017-230801

(51) Int. Cl.
*H04R 29/00*   (2006.01)
*G10L 21/0232*   (2013.01)
(Continued)

(52) U.S. Cl.
CPC .......... *G10L 21/0232* (2013.01); *G06N 20/00* (2019.01); *G10L 25/51* (2013.01);
(Continued)

(58) Field of Classification Search
CPC ..................................................... H04R 29/00
See application file for complete search history.

(56) References Cited

U.S. PATENT DOCUMENTS

2008/0107281 A1   5/2008 Togami et al.

FOREIGN PATENT DOCUMENTS

JP   09-247246 A   9/1997
JP   2000-252884 A   9/2000
(Continued)

OTHER PUBLICATIONS

International Search Report and Written Opinion of PCT Application No. PCT/JP2018/034411, dated Nov. 27, 2018, 10 pages of ISRWO.

*Primary Examiner* — Olisa Anwah
(74) *Attorney, Agent, or Firm* — Chip Law Group

(57) ABSTRACT

It is desirable to provide an echo cancellation technique that enables an environmental change to be flexibly addressed. Provided is a signal processing apparatus including: an echo cancellation unit that learns an estimated transfer characteristic in a space through which a signal reproduced by a speaker is input to a microphone, and performs echo cancellation on the basis of the estimated transfer characteristic learned; and an environmental change detection unit that detects an environmental change, in which the echo cancellation unit learns the estimated transfer characteristic by causing the speaker to reproduce a sound for learning on the basis of detection of the environmental change.

19 Claims, 17 Drawing Sheets

(51) Int. Cl.
*G06N 20/00* (2019.01)
*G10L 25/51* (2013.01)
*H04R 1/08* (2006.01)
*G10L 21/0208* (2013.01)
*G10L 21/0216* (2013.01)

(52) U.S. Cl.
CPC ............ *H04R 1/08* (2013.01); *H04R 29/001* (2013.01); *G10L 2021/02082* (2013.01); *G10L 2021/02163* (2013.01)

(56) References Cited

FOREIGN PATENT DOCUMENTS

| | | |
|---|---|---|
| JP | 2002-280938 A | 9/2002 |
| JP | 2005-236596 A | 9/2005 |
| JP | 2008-141718 A | 6/2008 |
| JP | 2009-033216 A | 2/2009 |
| JP | 2015-002460 A | 1/2015 |
| JP | 2016-116036 A | 6/2016 |

FIG. 17

|  | USER U1 | USER U2 | ... |
|---|---|---|---|
| GENRE | ○○ | | |
| TUNE | ×× | | |
| TEMPO | □□ | | |
| VOLUME | △△ | | |
| REPRODUCTION TIME ZONE | | | |
| ... | | | |

FIG. 18

| |
|---|
| SPECIFIC FREQUENCY |
| PLURALITY OF FREQUENCIES |
| LOW BAND |
| MIDDLE BAND |
| HIGH BAND |
| MIDDLE BAND OR LOWER |
| MIDDLE BAND OR HIGHER |
| LOW BAND AND HIGH BAND |

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2018/034411 filed on Sep. 18, 2018, which claims priority benefit of Japanese Patent Application No. JP 2017-230801 filed in the Japan Patent Office on Nov. 30, 2017. Each of the above-referenced applications is hereby incorporated herein by reference in its entirety.

TECHNICAL FIELD

The present disclosure relates to a signal processing apparatus, a signal processing method, and a program.

BACKGROUND ART

In recent years, various techniques have been disclosed as techniques for performing echo cancellation. For example, there is disclosed an echo canceler control system capable of promptly correcting the following of the transfer characteristic of an echo path to prevent an echo immediately after the start of a call even when connected to any connection destination (see, for example, Patent Document 1). Specifically, an echo canceler control system is disclosed which reduces initial convergence time by setting the initial value of an echo canceler to a filter coefficient substantially equal to the transfer characteristic of the echo path.

Such a technique is based on a configuration in which when an estimation error occurs in a filter coefficient during a call, a stored filter coefficient is transferred so as to reduce time during which a perceived echo continues.

CITATION LIST

Patent Document

Patent Document 1: Japanese Patent Application Laid-Open No. 2005-236596

SUMMARY OF THE INVENTION

Problems to be Solved by the Invention

In a case where an environmental change occurs, such as a case where furniture is placed in a room, transfer characteristics in the space may also change. However, it is generally difficult to flexibly address such changes in the transfer characteristics. Therefore, it is desirable to provide an echo cancellation technique that enables an environmental change to be flexibly addressed.

Solutions to Problems

According to the present disclosure, provided is a signal processing apparatus including: an echo cancellation unit that learns an estimated transfer characteristic in a space through which a signal reproduced by a speaker is input to a microphone, and performs echo cancellation on the basis of the estimated transfer characteristic learned; and an environmental change detection unit that detects an environmental change, in which the echo cancellation unit learns the estimated transfer characteristic by causing the speaker to reproduce a sound for learning on the basis of detection of the environmental change.

According to the present disclosure, provided is a signal processing method including: learning an estimated transfer characteristic in a space through which a signal reproduced by a speaker is input to a microphone, and performing echo cancellation on the basis of the estimated transfer characteristic learned; detecting an environmental change; and causing a processor to learn the estimated transfer characteristic by causing the speaker to reproduce a sound for learning on the basis of detection of the environmental change.

According to the present disclosure, provided is a program for causing a computer to function as a signal processing apparatus that includes: an echo cancellation unit that learns an estimated transfer characteristic in a space through which a signal reproduced by a speaker is input to a microphone, and performs echo cancellation on the basis of the estimated transfer characteristic learned; and an environmental change detection unit that detects an environmental change, in which the echo cancellation unit learns the estimated transfer characteristic by causing the speaker to reproduce a sound for learning on the basis of detection of the environmental change.

Effects of the Invention

As described above, according to the present disclosure, there is provided an echo cancellation technique that enables an environmental change to be flexibly addressed. Note that the above-described effect is not necessarily restrictive, and any of the effects set forth in the present specification or another effect that can be derived from the present specification may be achieved together with or instead of the above-described effect.

BRIEF DESCRIPTION OF DRAWINGS

FIG. 17 is a diagram showing an example of user information.

FIG. 18 is a diagram showing examples of types of frequency band for which estimated transfer characteristics are to be learned.

MODE FOR CARRYING OUT THE INVENTION

Figure 1:
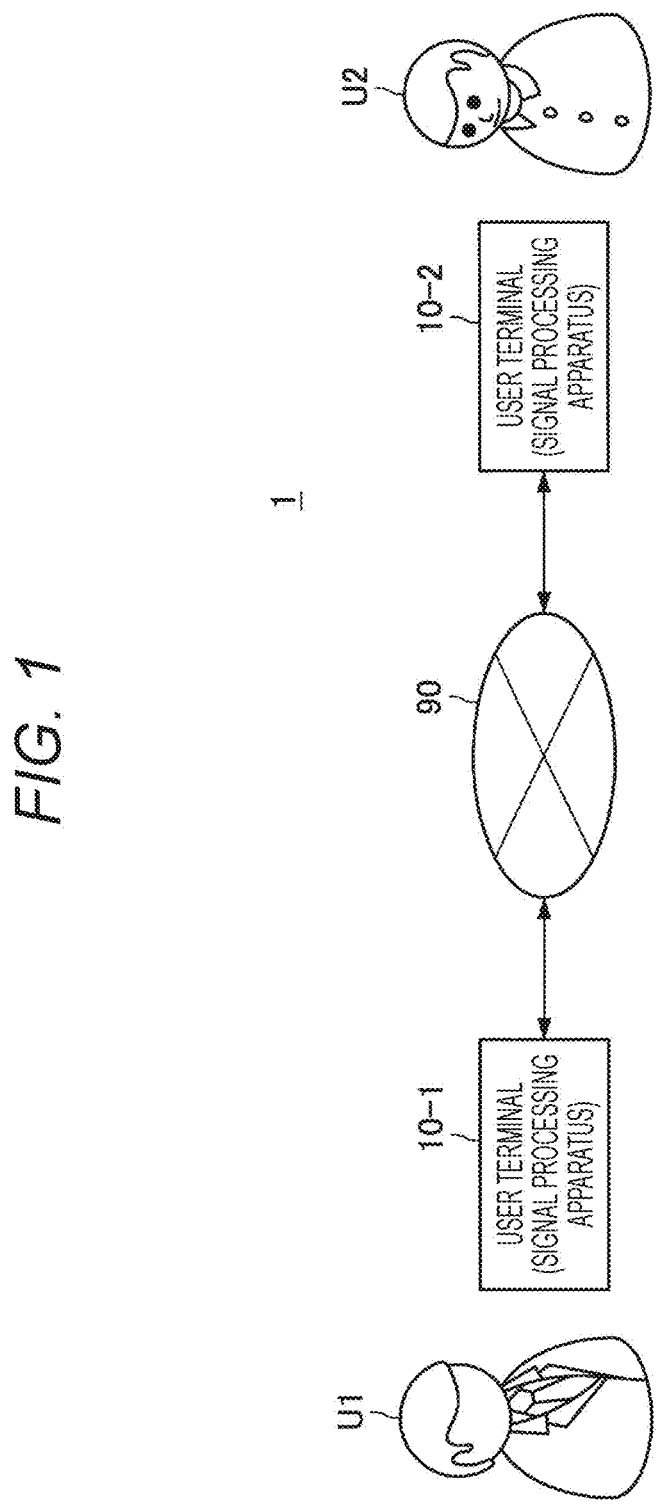
FIG. 1 is a diagram showing a configuration example of an information processing system according to embodiments of the present disclosure.

Preferred embodiments of the present disclosure will be described in detail below with reference to the accompanying drawings. Note that in the present specification and the drawings, the same reference signs are assigned to constituent elements having substantially the same functional configuration, and duplicate description will be thus omitted.

Furthermore, in the present specification and the drawings, there are cases where different numerals are added after the same reference signs assigned to a plurality of constituent elements having substantially the same or similar functional configuration, so as to distinguish the plurality of constituent elements. However, in a case where it is not necessary to particularly distinguish a plurality of constituent elements having substantially the same or similar functional configuration from each other, the same reference sign is simply assigned to each of the plurality of constituent elements. Furthermore, similar constituent elements in different embodiments may be distinguished by addition of different alphabets after the same reference signs. However, in a case where it is not necessary to particularly distinguish similar constituent elements from each other, the same reference sign is simply assigned to each of the constituent elements.

Note that description will be provided in the following order.

1. Overview
2. Details of Embodiments
2.1. Example of System Configuration
2.2. Functional Configuration Example of User Terminal
3. First Embodiment
3.1. Operation of Echo Canceler
3.2. Automatic Learning of Estimated Transfer Characteristics
3.3. Selection of Sound for Learning
3.4. Overall Flow
4. Second Embodiment
4.1. Automatic Generation of Sound for Learning
4.2. Overall Flow
5. Example of Hardware Configuration
6. Conclusion
7. Example

1. OVERVIEW

First, the overview of embodiments of the present disclosure will be described. Places where products requiring echo canceler technology are placed, the size of rooms, the materials of furniture and walls, and the like vary depending on users. Therefore, it is necessary to cancel an echo while sequentially learning how a sound (hereinafter, also referred to as "sound source") reproduced by a speaker of the own device is transmitted through the space to reach a microphone of the own device (hereinafter, also simply referred to as "microphone").

Due to its characteristics, an echo canceler cannot learn unless sound is reproduced by its own speaker at sufficient volume. During the period of insufficient learning, a phenomenon (double-talk) occurs in which user's voice overlaps with sound reproduced by the own device. Accordingly, in a case where the user's voice is used for phone conversation with the other party, sound that is difficult to hear is transmitted to the other party. Alternatively, in a case where the user's voice is used for voice recognition, a voice recognition rate is extremely reduced.

In order to avoid this, there is a product having the function of reproducing a sound for estimating transfer characteristics for a certain period of time at the time of, for example, initial setting of a device and the like and causing the estimated transfer characteristics to be learned. However, even if the learning is completed once, the transfer characteristics of the space may then change depending on the situation in which furniture is rearranged, a curtain is opened and closed, or someone moves. Therefore, it takes time to estimate transfer characteristics every time an environmental change occurs, and during that time, call quality and the voice recognition rate deteriorate.

Furthermore, if stationary noise is present in a frequency band during the learning at the time of initial setting or the like, the transfer characteristics of the frequency band cannot be sufficiently learned. Thus, full performance may not be achieved with the learning at the time of initial setting alone.

Therefore, in the embodiments of the present disclosure, the transfer characteristics of the space are estimated from a sound reproduced by a speaker of the own device and the sound input to a microphone after wrapping around. Thus, the transfer characteristics are sequentially learned, so that an echo is canceled. At this time, the signal input to the microphone is separated on a frequency axis by fast Fourier transform, and echo cancellation is performed for each frequency.

Furthermore, in the embodiments of the present disclosure, the sufficiency of the learning of transfer characteristics is determined from the magnitude of an error signal that is a signal processed by an echo canceler. In a case where it is determined that the learning of transfer characteristics of the environment is insufficient, a sound for learning is reproduced by a speaker of the own device and the learning of estimated transfer characteristics is automatically performed. At this time, the learning may be performed for each frequency band. Then, it is possible to reproduce only a sound in a frequency band, for which the learning of estimated transfer characteristics needs to be performed, until the learning is completed.

Moreover, the learning of estimated transfer characteristics requires a sound for learning to be reproduced by a speaker at sufficient volume. However, reproducing only a sound of a specific frequency may be uncomfortable for users. In addition, it is difficult for users to understand whether or not the learning of estimated transfer characteristics is insufficient because it is difficult to understand the internal state of a device. Thus, it is also difficult to know when the sound for learning is reproduced. Therefore, in the embodiments of the present disclosure, taste in music or the like that is regularly reproduced is grasped on the basis of user operation. Then, music that meets the user's taste and includes sufficient sound in a frequency band necessary for the learning of estimated transfer characteristics is selected or generated to be reproduced by a speaker.

The overview of the embodiments of the present disclosure has been described above.

2. DETAILS OF EMBODIMENTS

Hereinafter, details of the embodiments of the present disclosure will be described.

[2.1. Example of System Configuration]

First, a configuration example of an information processing system according to the embodiments of the present disclosure will be described.

FIG. 1 is a diagram showing a configuration example of an information processing system according to the embodiments of the present disclosure. As shown in FIG. 1, an information processing system 1 includes a user terminal 10-1 and a user terminal 10-2. The user terminal 10-1 can be used by user U1. Furthermore, the user terminal 10-2 can be used by user U2. The user terminal 10-1 and the user terminal 10-2 are connected to a network 90, and are configured such that the user terminal 10-1 and the user terminal 10-2 can communicate with each other via the network 90.

Assumed in the embodiments of the present disclosure is a case where the user terminal 10-1 and the user terminal 10-2 are used for phone communication between user U1 and user U2. That is, the voice of user U1 is transmitted from the user terminal 10-1 to the user terminal 10-2, and the voice of user U2 is transmitted from the user terminal 10-2 to the user terminal 10-1. Assumed is a case where, at this time, a sound obtained as a result of performing echo cancellation on a voice input to a microphone is transmitted to a terminal of the other party.

However, the configuration example of the information processing system 1 is not limited to such an example. For example, the information processing system according to the embodiments of the present disclosure may be configured such that the voice of user U1 is used for content being reproduced by the user terminal 10-1. In such a case, a sound obtained as a result of performing echo cancellation on a voice input to a microphone of the user terminal 10-1 is input to a voice recognizer. Then, the result of voice recognition is input to the content being reproduced. That is, the information processing system may not include the user terminal 10-2 (user U2 does not need to exist).

Furthermore, a case where the user terminal 10-1 and the user terminal 10-2 are personal computers (PCs) is mainly assumed in the embodiments of the present disclosure. However, the user terminal 10-1 and the user terminal 10-2 are not limited to PCs. For example, at least one of the user terminal 10-1 or the user terminal 10-2 may be a mobile phone, a tablet terminal, a smartphone, a head-mounted display, or a camera. In addition, user U1 may have a phone conversation with an AI speaker or the like. At this time, a response from user U2 can be replaced with a response from artificial intelligence. Each of the user terminal 10-1 and the user terminal 10-2 can function as a signal processing apparatus.

The configuration example of the information processing system 1 according to the embodiments of the present disclosure has been described above.

[2.2. Functional Configuration Example of User Terminal]

Next, a functional configuration example of a user terminal 10 will be described.

Figure 2:
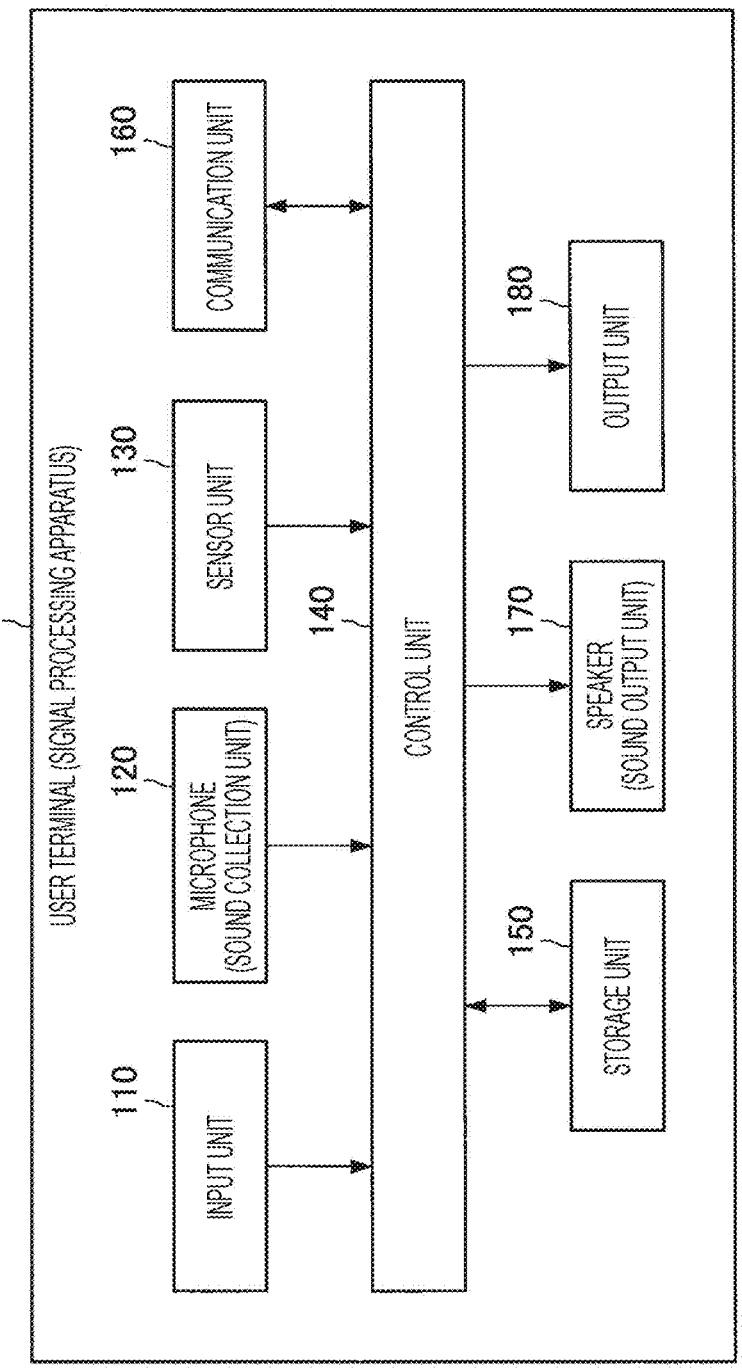
FIG. 2 is a diagram showing a functional configuration example of a user terminal according to the embodiments of the present disclosure.

FIG. 2 is a diagram showing an example of the functional configuration of the user terminal 10. As shown in FIG. 2, the user terminal 10 includes an input unit 110, a microphone (sound collection unit) 120, a sensor unit 130, a control unit 140, a storage unit 150, a communication unit 160, a speaker (sound output unit) 170, and an output unit 180. Hereinafter, these functional blocks included in the user terminal 10 will be described.

The input unit 110 has the function of receiving an operation input from a user. A case where the input unit 110 includes a mouse and a keyboard is mainly assumed in the embodiments of the present disclosure. However, the input unit 110 may include a touch panel, may include a button, may include a switch, or may include a lever or the like. Furthermore, the input unit 110 may include a microphone that detects a user's voice.

The microphone 120 can function as an example of a sound collection unit. The microphone 120 detects ambient sound (ambient sound is input to the microphone 120). The sound input to the microphone 120 may include a user's utterance in addition to a sound reproduced by the speaker 170. Furthermore, sound to be detected by the microphone 120 may also include noise and the like. The sound input to the microphone 120 is subjected to echo cancellation. In addition, the sound input to the microphone 120 is also used to learn estimated transfer characteristics.

The sensor unit 130 obtains sensing data by sensing the environment. Mainly assumed in the embodiments of the present disclosure is a case where sensing data obtained by the sensor unit 130 include data (image) obtained as a result of sensing by a camera (for example, an RGB camera, a depth camera, a polarization camera, or the like) and data (infrared light) obtained as a result of sensing by an infrared sensor. However, sensing data obtained by the sensor unit 130 may be data obtained as a result of sensing by at least any one of a camera, an infrared sensor, an ultrasonic sensor, an acceleration sensor, a gyro sensor, a laser sensor, a vibration sensor, or a global positioning system (GPS) sensor.

The control unit 140 may include, for example, one or a plurality of processing devices such as a central processing unit (CPU). In a case where these blocks include a processing device such as a CPU, such a processing device may include an electronic circuit. The control unit 140 can be implemented by a program executed by such a processing device. Here, a detailed configuration of the control unit 140 will be described.

The storage unit 150 is a recording medium that includes a memory and stores a program to be executed by the control unit 140 and data necessary for execution of the program. Furthermore, the storage unit 150 temporarily stores data for calculation by the control unit 140. For example, the storage unit 150 includes a magnetic storage device, a semiconductor storage device, an optical storage device, or a magneto-optical storage device.

The communication unit 160 includes a communication circuit, and has the function of communicating with another device via the network 90. For example, the communication unit 160 has the function of acquiring data from the another device and providing data to the another device. For example, the communication unit 160 includes a communication interface. Note that the control unit 140 described above also enables the use of a voice recognition engine, an agent interactive application on the cloud, and the like. At this time, the voice recognition engine and the interactive application may exist in the device (user terminal 10) instead of being used via the communication circuit.

The speaker 170 can function as an example of a sound output unit. Specifically, the speaker 170 reproduces content (audio signal) reproduced by the user terminal 10 of a far-end speaker (for example, in the example shown in FIG. 1, user U2 is a far-end speaker for user U1, and user U1 is a far-end speaker for user U2) and a sound generated in the user's own user terminal 10. The sound reproduced by the speaker 170 is aurally perceived by the user.

The output unit 180 outputs various types of information. For example, the output unit 180 may include a display capable of providing display that can be visually recognized by a user. At this time, the display may be a liquid crystal display, an organic electro-luminescence (EL) display, or a projector that can perform projection onto a wall or the like. Alternatively, the output unit 180 may be a light such as a light-emitting diode (LED). Note that in a case where, for example, there is no need to display information and the like, the user terminal 10 may not include the output unit 180.

Note that mainly assumed in the embodiments of the present disclosure is a case where the input unit 110, the microphone 120, the sensor unit 130, the storage unit 150, the communication unit 160, the speaker 170, and the output unit 180 exist in the user terminal 10. However, at least any one of the input unit 110, the microphone 120, the sensor unit 130, the storage unit 150, the communication unit 160, the speaker 170, or the output unit 180 may exist outside the user terminal 10.

The functional configuration example of the user terminal 10 according to the embodiments of the present disclosure has been described above.

3. FIRST EMBODIMENT

Figure 3:
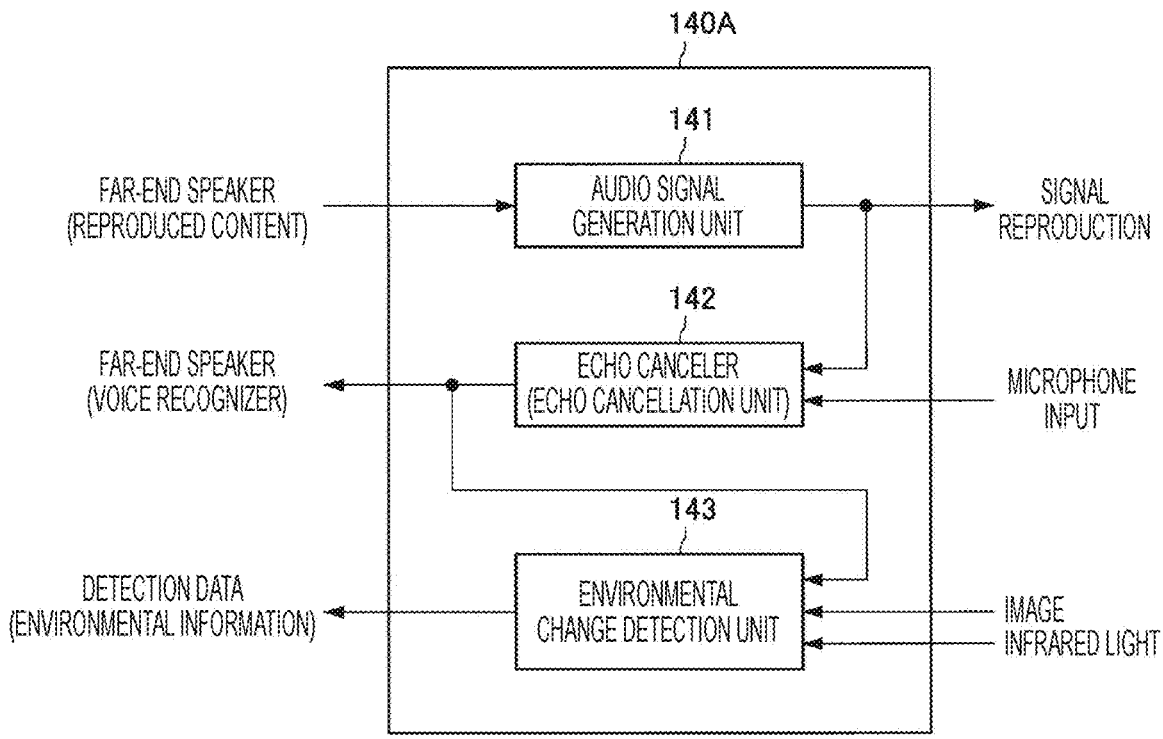
FIG. 3 is a diagram showing a detailed configuration example of a control unit according to a first embodiment of the present disclosure.

Hereinafter, a first embodiment of the present disclosure will be described. FIG. 3 is a diagram showing a detailed configuration example of a control unit 140A according to the first embodiment of the present disclosure. As shown in FIG. 3, the control unit 140A according to the first embodiment of the present disclosure includes an audio signal generation unit 141, an echo canceler (echo cancellation unit) 142, and an environmental change detection unit 143.

The audio signal generation unit 141 generates a signal (speaker reproduction signal) to be reproduced by a speaker, on the basis of a signal provided from a far-end speaker (for example, user U2 in a case where the control unit 140A shown in FIG. 3 exists in the user terminal 10-1 of user U1).

The echo canceler 142 performs echo cancellation on the basis of the speaker reproduction signal and a signal (microphone input signal) input to a microphone, and provides the processed signals to the far-end speaker. Specifically, the echo canceler 142 learns estimated transfer characteristics in the space through which a speaker reproduction signal is input to the microphone, and performs echo cancellation on the basis of the estimated transfer characteristics learned. The echo canceler 142 causes the speaker to reproduce a sound for learning on the basis of an environmental change detected by the environmental change detection unit 143, and learns estimated transfer characteristics.

The environmental change detection unit 143 detects an environmental change. More specifically, the environmental change detection unit 143 detects an environmental change on the basis of detection data (environmental information) related to the environment. A case where such detection data are sensing data is mainly assumed in the embodiment of the present disclosure.

As an example, in the embodiment of the present disclosure, the environmental change detection unit 143 detects an environmental change on the basis of the signals processed by the echo canceler 142 and sensing data (for example, an image sensed by a camera, infrared light sensed by an infrared sensor, and the like). However, the sensing data may be obtained by another sensor. Furthermore, an environmental change may be detected on the basis of data for notifying an environmental change (for example, notification of an environmental change may be received from a user or an external device) instead of sensing data.

Hereinafter, the function of each block will be described in more detail.

(3.1. Operation of Echo Canceler)

Figure 4:
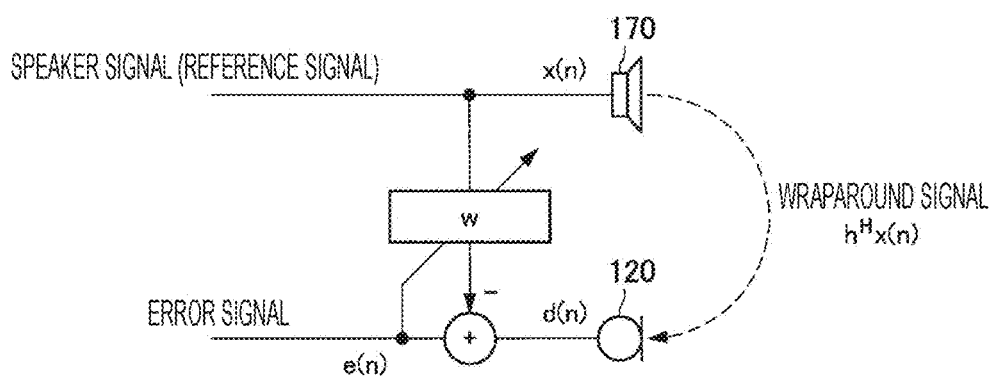
FIG. 4 is a diagram for describing basic operation of an echo canceler.

The basic operation of the echo canceler 142 will be described with reference to FIG. 4. FIG. 4 is a diagram for describing the basic operation of the echo canceler 142. Assuming that a signal reproduced by the speaker 170 in a certain time frame n is defined as the reference signal x(n), x(n) is output from the speaker 170 and then input to the microphone 120 through the space. The spatial transfer characteristic h before the arrival of x(n), as the microphone input signal d(n), at the microphone 120 is unknown. The echo canceler 142 estimates the unknown transfer characteristic h, and implements echo cancellation by subtracting, from the microphone input signal d(n), a reference signal in consideration of the estimated transfer characteristic.

Here, the estimated transfer characteristic is defined as w. A speaker reproduction signal that reaches the microphone 120 includes a component directly coming from the speaker 170, and may also include a component having a certain time delay, such as that reflected back from a wall or the like. Therefore, in a case where target delay time in the past is expressed as the tap length L, the speaker reproduction signal x(n) and the estimated transfer characteristic w are expressed as (Equation 1) below.

[Math. 1]

$$x(n)=[x_n, x_{n-1}, \ldots, x_{n-L+1}]^T$$

$$w(n)=[w_n, w_{n-1}, \ldots, w_{n-L+1}]^T \quad \text{(Equation 1)}$$

Figure 5:
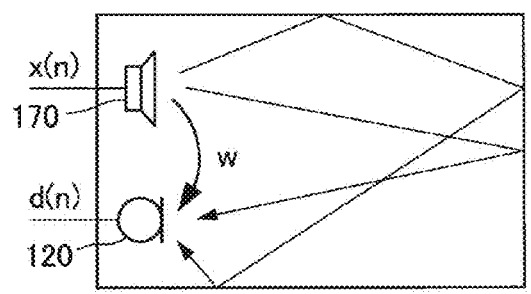
FIG. 5 is a diagram for describing the concept of estimated transfer characteristics.

Here, T represents transposition. FIG. 5 is a diagram for describing the concept of estimated transfer characteristics. The echo canceler 142 actually performs estimation of the number N of frequency bins obtained by fast Fourier transform on the time frame n. In a case where a general least mean square (LMS) method is used, the processing of echo cancellation at the k-th frequency (k=1 to N) is performed by the echo canceler 142 as shown in (Equation 2) below.

[Math. 2]

$$e(k,n)=d(k,n)-w(k,n)^H x(k,n)$$

$$w(k,n+1)=w(k,n)+\mu e(k,n)^* x(k,n) \quad \text{(Equation 2)}$$

In (Equation 2), H represents Hermitian transpose, and represents a complex conjugate. The symbol p represents a step size for determining a learning speed, and generally has a value selected from a range written as 0<μ≤2. The echo canceler 142 obtains the error signal e(k, n) by subtracting an estimated wraparound signal from a microphone input signal. The estimated wraparound signal is obtained from reference signals convolved with estimated transfer characteristics. The number of the reference signals corresponds to the tap length L. In the LMS method, w is sequentially updated such that the average power (for example, a root mean square) of the error signal e(k, n) is minimized.

In addition to the LMS method, methods such as normalized LMS (NLMS), affine projection algorithm (APA), and recursive least square (RLS) can be provided for echo cancellation processing. In NLMS, a reference signal in an update equation is normalized. In any method, estimated transfer characteristics cannot be learned without the reference signal x.

Figure 6:
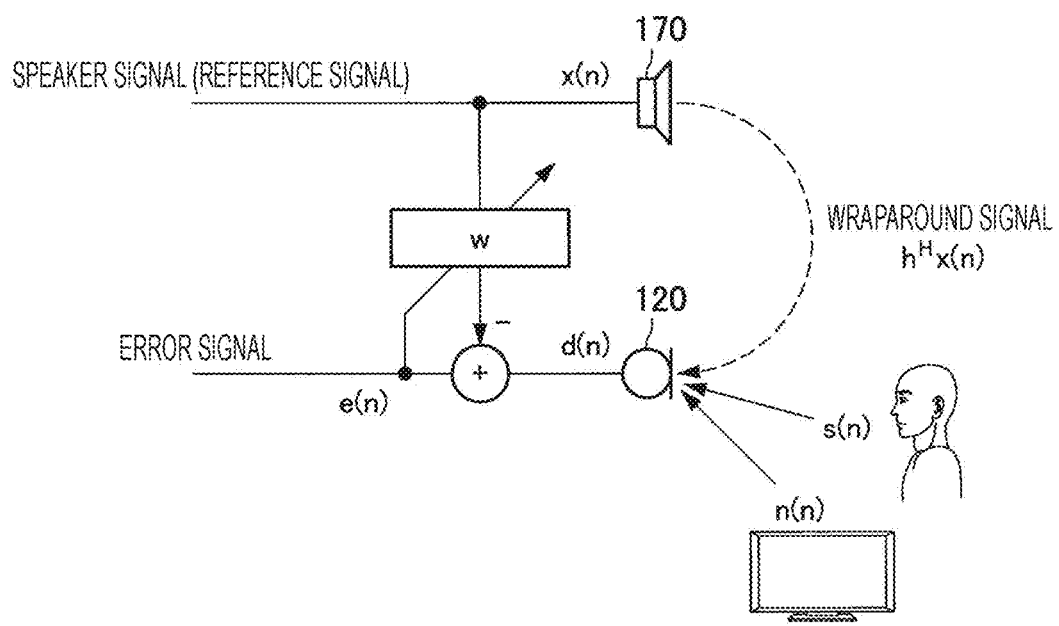
FIG. 6 is a diagram showing how erroneous learning of estimated transfer characteristics occurs.

Note that in a case where, for example, the microphone input signal contains a near-end speaker's utterance, suddenly generated noise, or the like, these are also used for learning. Accordingly, there is a possibility that a phenomenon (double-talk) occurs in which the learning of estimated transfer characteristics is not accurately performed. FIG. 6 is a diagram showing how erroneous learning of estimated transfer characteristics occurs. In the example shown in FIG. 6, the utterance s(n) of the near-end speaker and the noise n(n) emitted by a television device are also input to the microphone 120. In such a case, it is desirable that learning be performed at least after input of s(n) and n(n) is stopped, so as to avoid erroneous learning of estimated transfer characteristics.

(3.2. Automatic Learning of Estimated Transfer Characteristics)

Here, it takes a certain amount of time to learn estimated transfer characteristics for enabling the echo canceler 142 to fully exhibit its performance. In addition, the convergence speed thereof depends on a sound source to be reproduced. In the echo canceler 142 that estimates transfer characteristics for each frequency band, white noise including signals in all frequency bands is suitable to estimate transfer characteristics of all the frequency bands most quickly.

Figure 7:
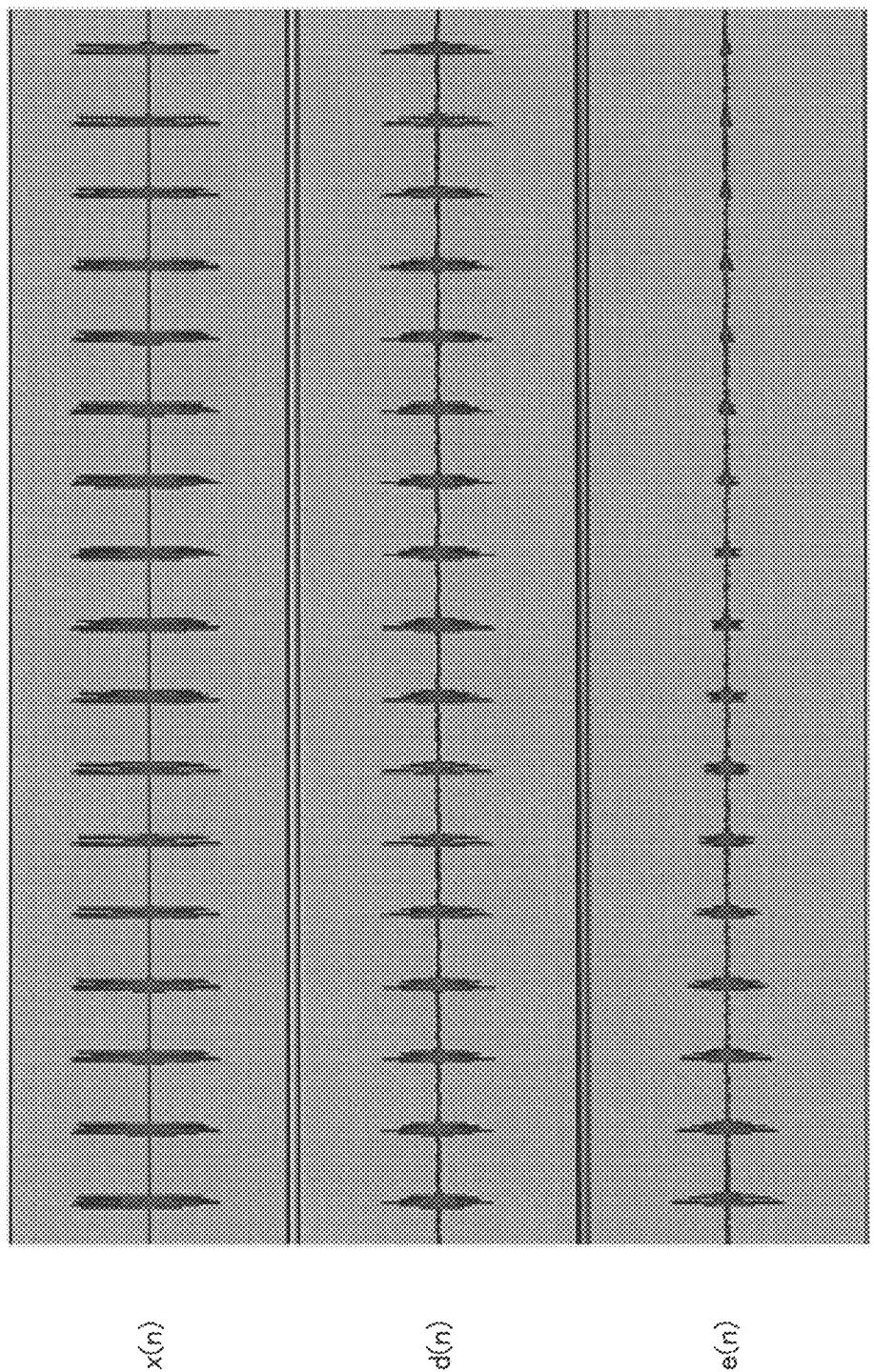
FIG. 7 is a diagram showing examples of a reference signal, a microphone input signal, and an error signal in a case where no period for learning estimated transfer characteristics is provided.
Figure 8:
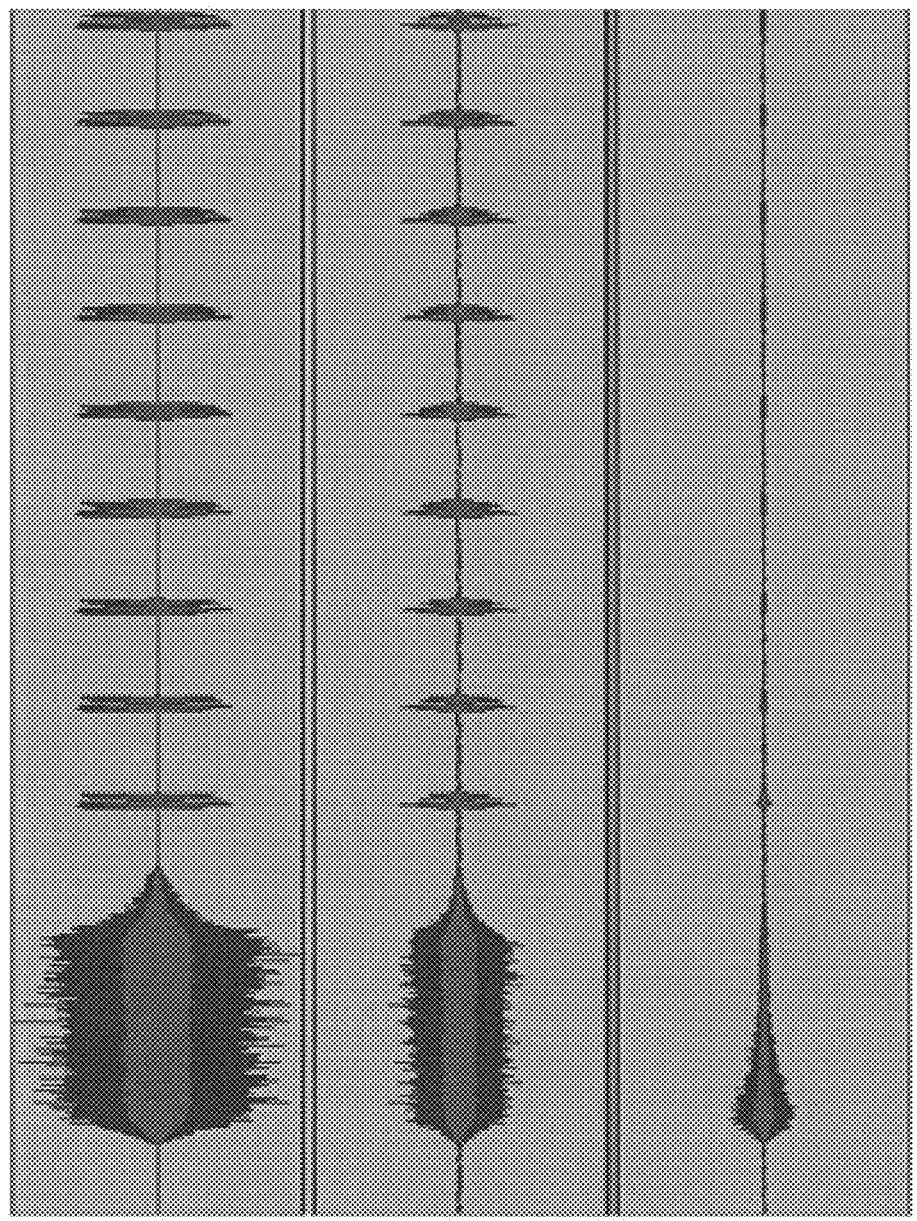
FIG. 8 is a diagram showing examples of a reference signal, a microphone input signal, and an error signal in a case where a period for learning estimated transfer characteristics is provided (particularly, in a case where white noise is reproduced by a speaker).

FIG. 7 is a diagram showing examples of the reference signal x(n), the microphone input signal d(n), and the error signal e(n) in a case where no period for learning estimated transfer characteristics is provided. Meanwhile, FIG. 8 is a diagram showing examples of the reference signal x(n), the microphone input signal d(n), and the error signal e(n) in a case where a period for learning estimated transfer characteristics is provided (particularly, in a case where white noise is reproduced by a speaker). In all the examples shown in FIGS. 7 and 8, the horizontal axes are time axes. In the examples shown in FIG. 8, large signal fluctuations in the reference signal x(n) and the microphone input signal d(n) immediately after the start of measurement correspond to a period for reproducing white noise.

Referring to FIG. 8, it can be seen that the reduction amount of the error signal e(n) increases with time. This indicates that the estimation accuracy of the transfer characteristics of the space gradually increases. An echo cancellation amount based on the estimated transfer characteristics eventually reaches a performance limit and converges. The echo canceler 142 has information on both the microphone input signal d(n) and the error signal e(n) after the echo cancellation processing. Therefore, the echo canceler 142 can perform calculations on how much echo has been canceled for each frequency band at the time of convergence of echo cancellation. This index is called Echo Return Loss Enhancement (ERLE) and is represented by (Equation 3) below.

[Math. 3]

$$ERLE(k, n) = 10 \log_{10} \frac{E[d^2(k, n)]}{E[(d(k, n) - y(k, n))^2]} \quad \text{(Equation 3)}$$

In (Equation 3), E[ ] represents an expected value, and y(k, n) is an estimated wraparound signal obtained as a result of multiplying x by the complex conjugate of the estimated transfer characteristic w. For example, in a case where the transfer characteristic h of the space changes to h', the difference between the transfer characteristic h and the estimated transfer characteristic w of the space increases, so that the echo cancellation amount decreases. Accordingly, the value of ERLE in (Equation 3) decreases. Therefore, ERLE enables the environmental change detection unit 143 to grasp an environmental change of the space. Specifically, in a case where the value of ERLE is lower than a predetermined threshold, the environmental change detection unit 143 can detect that the value of ERLE being lower than the predetermined threshold indicates an environmental change.

However, the value of ERLE may similarly decrease also during double-talk. Therefore, assumed in the embodiment of the present disclosure is a case where sensing data obtained by a sensor such as a camera or an infrared sensor are also used in addition to ERLE, so as to accurately grasp an environmental change. In such a case, in a case where a value based on the sensing data becomes larger than a predetermined threshold, it is possible to detect that the value based on the sensing data being larger than the predetermined threshold indicates an environmental change. However, this does not mean that both ERLE and sensing data need always be used for detecting an environmental change. Only one of ERLE or sensing data may be used for detecting an environmental change.

In a case where the environmental change detection unit 143 detects an environmental change on the basis of information on at least any one of ERLE, an image sensed by a camera, or infrared light sensed by an infrared sensor, the echo canceler 142 automatically causes a sound for learning to be reproduced by the speaker 170 to learn estimated transfer characteristics.

Here, if only the performance of the echo canceler 142 is sought, learning is possible if white noise is reproduced for hours. However, if white noise is automatically reproduced in response to an environmental change detected by the user terminal 10, a user does not know when a sound for learning is output from the user terminal 10. Moreover, white noise suddenly reproduced at a high volume is very harsh. Thus, a user may get uncomfortable as a result of automatic learning being performed by use of white noise as it is.

However, if the sound (speaker reproduction sound source) for learning estimated transfer characteristics is changed from white noise to another sound source, some frequency bands do not contain signals sufficient for learning depending on the type of sound source. Thus, even if the sound for learning is output from the speaker, the learning may not progress easily. Therefore, it is necessary to select or generate, in advance, a sound containing sufficient signals in a frequency band to be learned (a frequency band for which learning is required) as a sound for learning.

Furthermore, the same sound does not have to be constantly output as the sound for learning. That is, the sound for learning may have a rhythm and a scale like ordinary music. In such a case, the convergence of estimated transfer characteristics is awaited while the sound for learning is reproduced for a longer time than a case where white noise is used as the sound for learning. In a case where the echo canceler 142 determines that the estimated transfer characteristics have sufficiently converged, the echo canceler 142 just need to cause the speaker 170 to end reproduction of the sound for learning.

Here, the echo canceler 142 may determine that the estimated transfer characteristics have sufficiently converged, by any method that is not particularly limited. As an example, in a case where the value of ERLE is stably maintained at a high level, it may be determined that the estimated transfer characteristics have sufficiently converged, on the basis of the stable high value of ERLE. Alternatively, in a case where the average mobility of w in the estimated transfer characteristic update equation becomes smaller than a predetermined value, it may be determined that the estimated transfer characteristics have sufficiently converged, on the basis of the average mobility of w in the estimated transfer characteristic update equation being smaller than the predetermined value.

Figure 9:
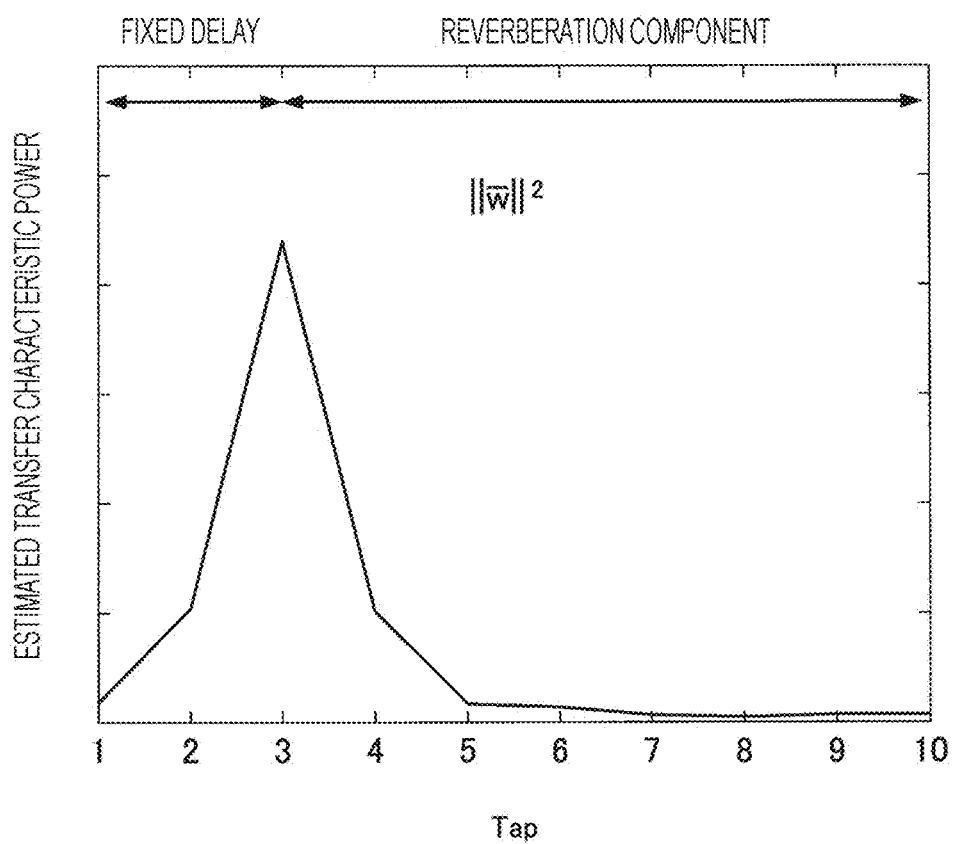
FIG. 9 is a diagram showing an example of the average value of estimated transfer characteristics.
Figure 10:
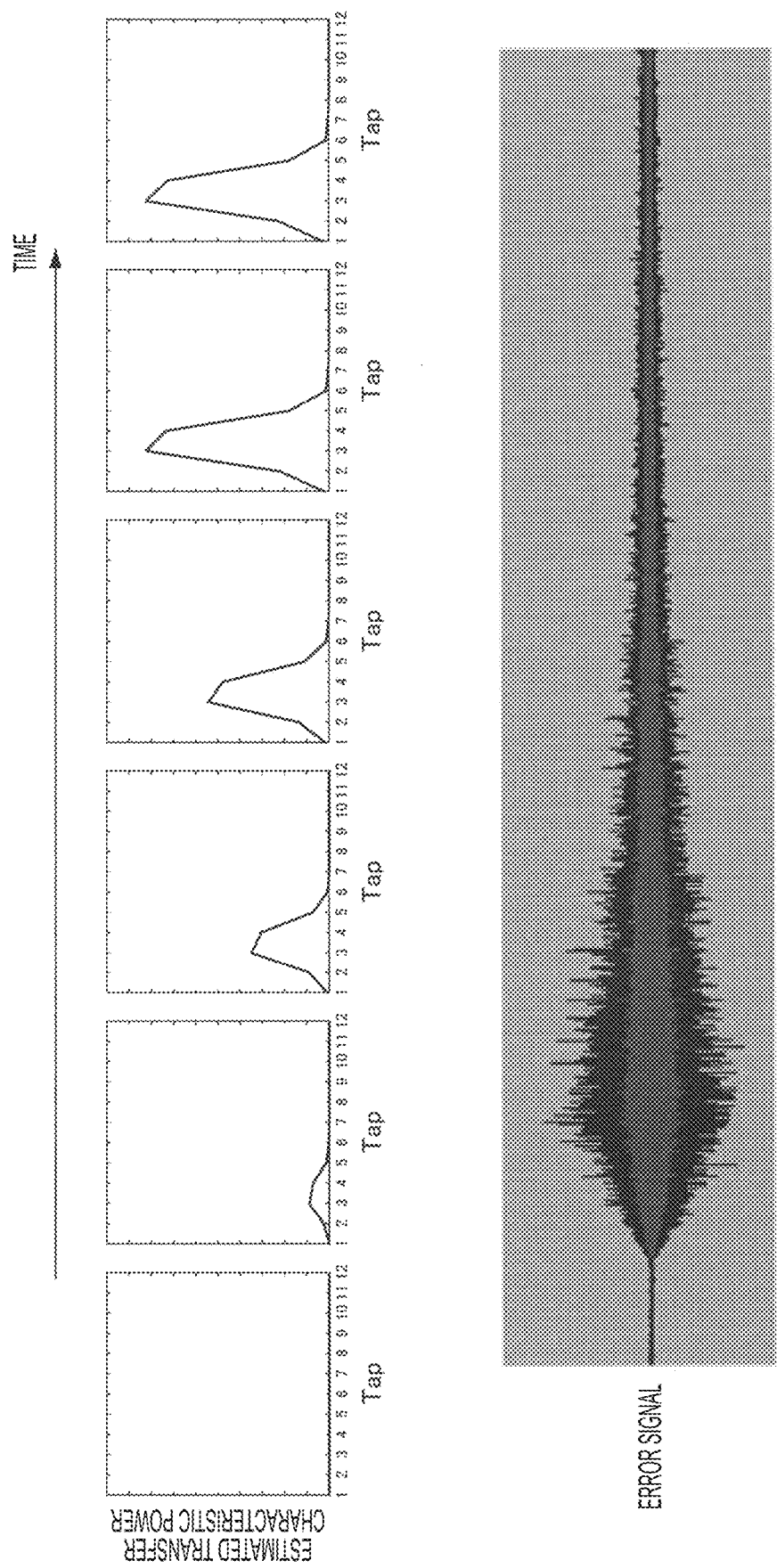
FIG. 10 is a diagram showing how the root mean square of the norm of estimated transfer characteristics changes over time, together with a change of an error signal.

FIG. 9 is a diagram showing an example of the average value of the estimated transfer characteristics w. In the example shown in FIG. 9, the root mean square of the norm of the estimated transfer characteristics w is used as an example of the average value of the estimated transfer characteristics w. Furthermore, FIG. 10 is a diagram showing how the root mean square of the norm of the estimated transfer characteristics w changes over time, together with a change of an error signal. As shown in FIG. 10, the mobility of the root mean square of the norm of the estimated transfer characteristics w decreases with time. At this time, it may be determined that the estimated transfer characteristics have sufficiently converged, on the basis of the mobility of the root mean square of the norm of the estimated transfer characteristics w being smaller than a predetermined value.

As described above, the environmental change detection unit 143 may detect an insufficiency of the learning of estimated transfer characteristics, as an environmental change. At this time, the environmental change detection unit 143 may detect an insufficiency of the learning of estimated transfer characteristics on the basis that an echo cancellation amount (ERLE) based on estimated transfer characteristics learned by the echo canceler 142 is lower than a predetermined threshold.

(3.3. Selection of Sound for Learning)

Assumed here is a case where it is necessary to relearn estimated transfer characteristics as a result of a reduction of the ERLE of a frequency band for which estimated transfer characteristics have not been learned correctly due to noise contamination during learning at the time of initial setting or the like, or as a result of a reduction of the ERLE of a specific frequency due to an actual change in the transfer characteristics of the space caused by a change in the arrangement of furniture, or the like. In such a case, the sound for learning (speaker reproduction sound source) does not need to be white noise, and it is sufficient if a signal is included at least in a frequency band for which estimated transfer characteristics need to be learned.

That is, it is preferable to prepare in advance a sound for learning (speaker reproduction sound source) having a signal in a frequency band for which estimated transfer characteristics are to be learned (a frequency band for which learning is required). At this time, the echo canceler 142 can learn the estimated transfer characteristics of a specific frequency band by causing the speaker 170 to reproduce the sound for learning (speaker reproduction sound source).

Figure 11:
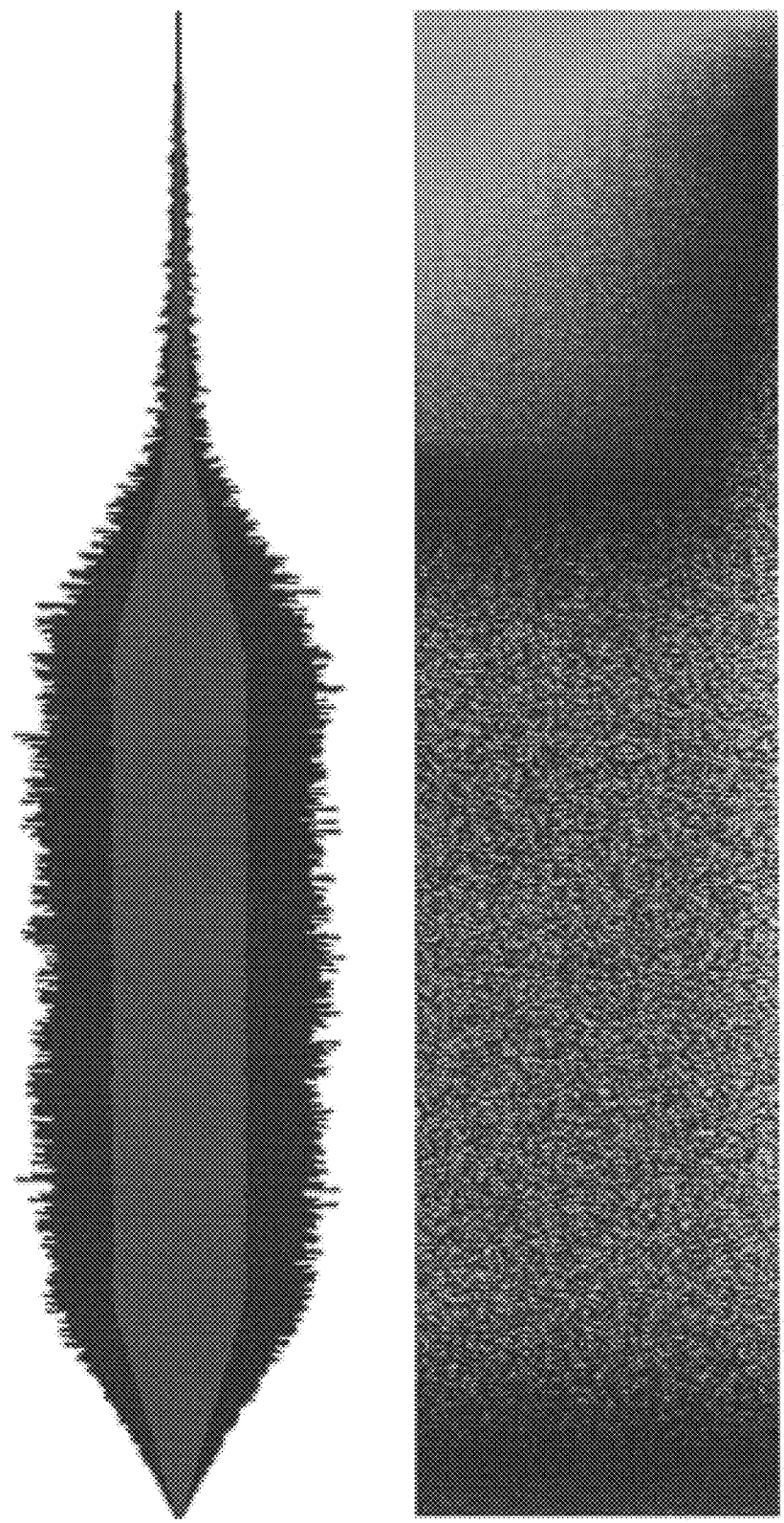
FIG. 11 is a diagram showing a time change of each of the waveform of an error signal and a frequency spectrum for a sound source.
Figure 12:
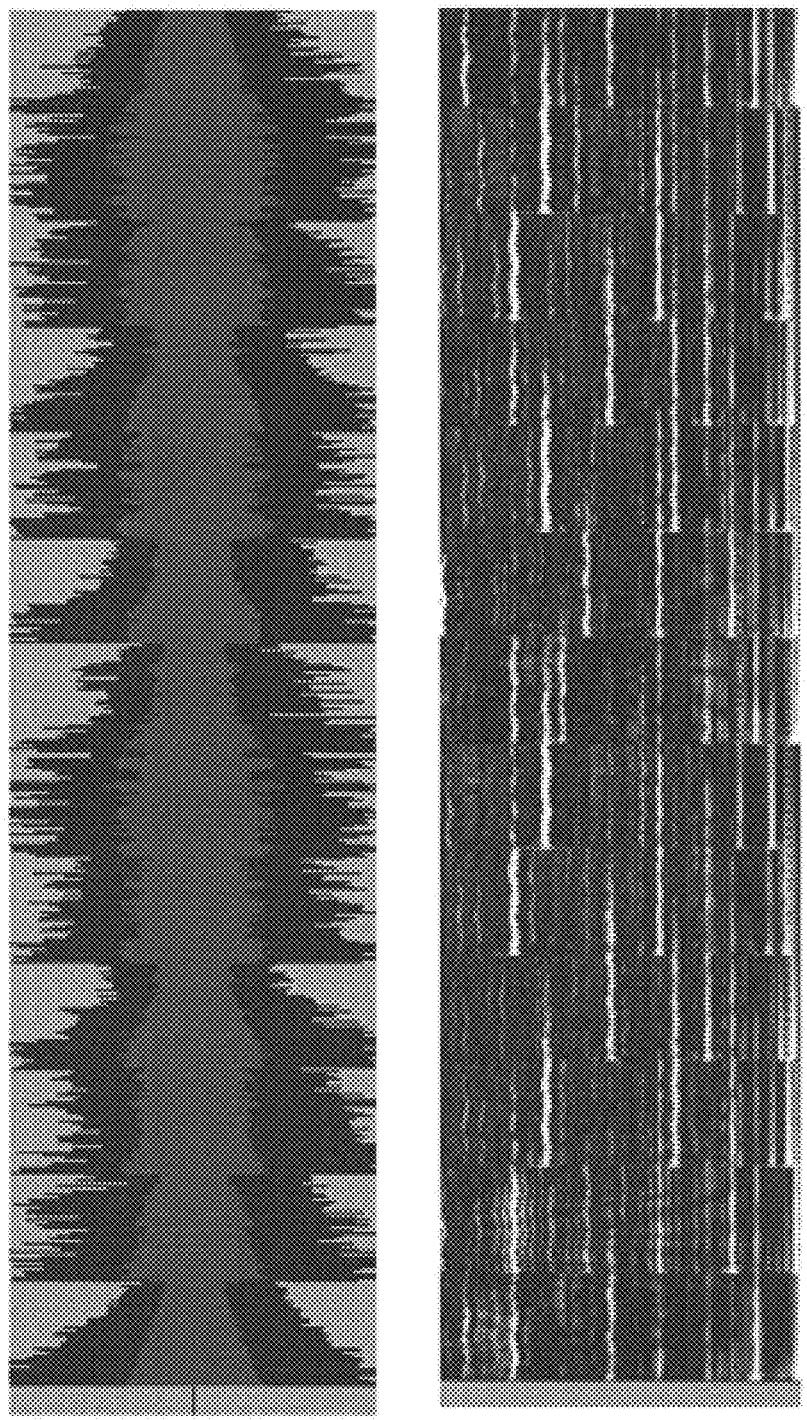
FIG. 12 is a diagram showing a time change of each of the waveform of an error signal and a frequency spectrum for another sound source.
Figure 13:
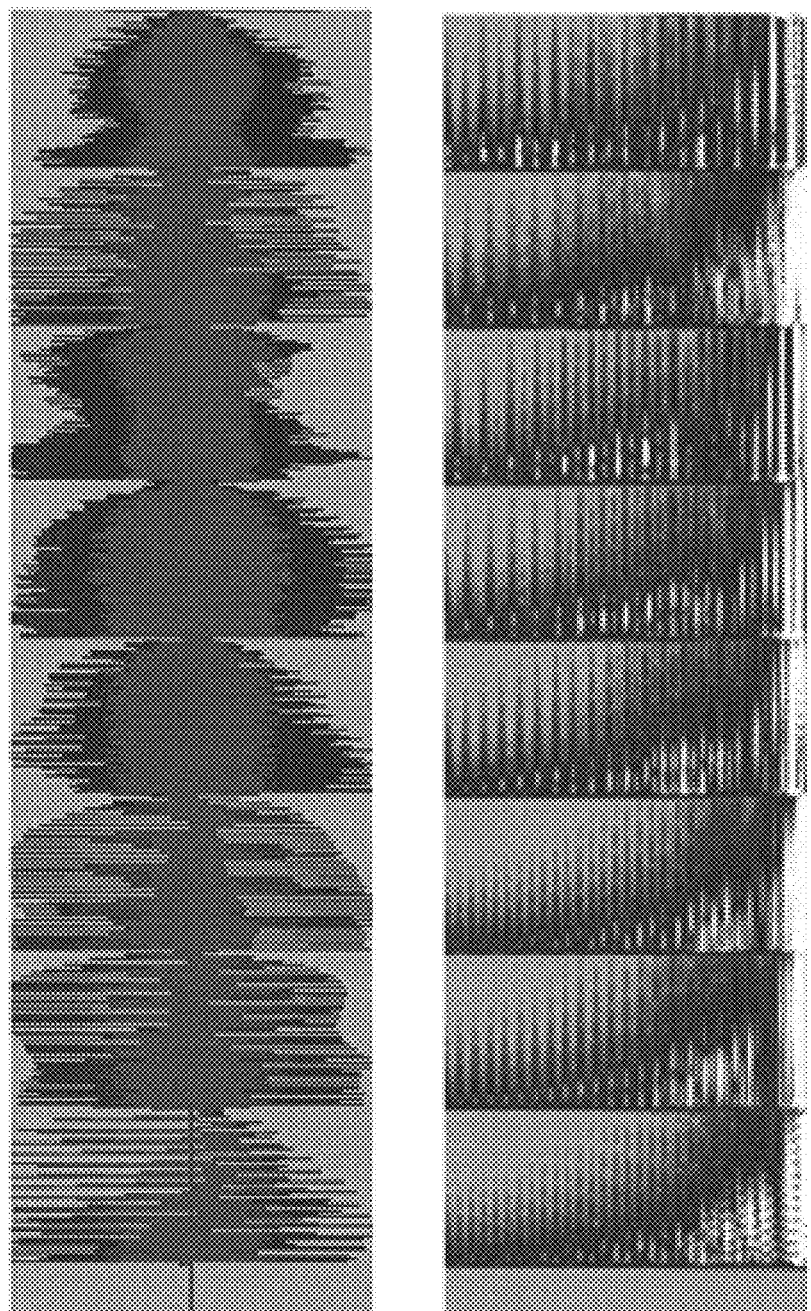
FIG. 13 is a diagram showing a time change of each of the waveform of an error signal and a frequency spectrum for still another sound source.

Examples are shown in FIGS. 11 to 13. FIG. 11 to FIG. 13 are diagrams each showing a time change of the waveform of an error signal and a time change of a frequency spectrum for each sound source. In the examples shown in FIGS. 11 to 13, a, b, and c represent three different types of sound source. The symbol_t following a, b, and c represents a time change of the waveform of an error signal for each sound source. In addition, the symbol_f represents a time change of a frequency spectrum for each sound source. The symbol a represents a sound source close to white noise containing signal components in all frequency bands. The symbol b represents a sound source having fewer signals in the high band and the low band and many signal components in the middle band. The symbol c represents a sound source in which many signal components are concentrated in the low band.

For example, such sound sources are prepared in advance. The echo canceler 142 adopts the sound source of b in a case where it is determined that the learning of estimated transfer characteristics is insufficient in the middle band. Meanwhile, the echo canceler 142 adopts the sound source of c in a case where it is determined that the learning of estimated transfer characteristics is insufficient in the low band. Thus, the echo canceler 142 causes the speaker 170 to reproduce the adopted sound source to perform automatic learning. It is possible to avoid reproducing white noise that makes a user uncomfortable, by thus selecting an optimal sound source in accordance with the state of learning of estimated transfer characteristics for each frequency band.

As described above, the sound for learning may be a sound including a signal in a predetermined frequency band for which estimated transfer characteristics are to be learned by the echo canceler 142. At this time, the signal in the predetermined frequency band may be determined on the basis of the amount of echo cancellation for each frequency band. Another embodiment relating to a sound including a signal in a predetermined frequency band for which estimated transfer characteristics are to be learned by the echo canceler 142 will be described in a second embodiment of the present disclosure.

(3.4. Overall Flow)

Figure 14:
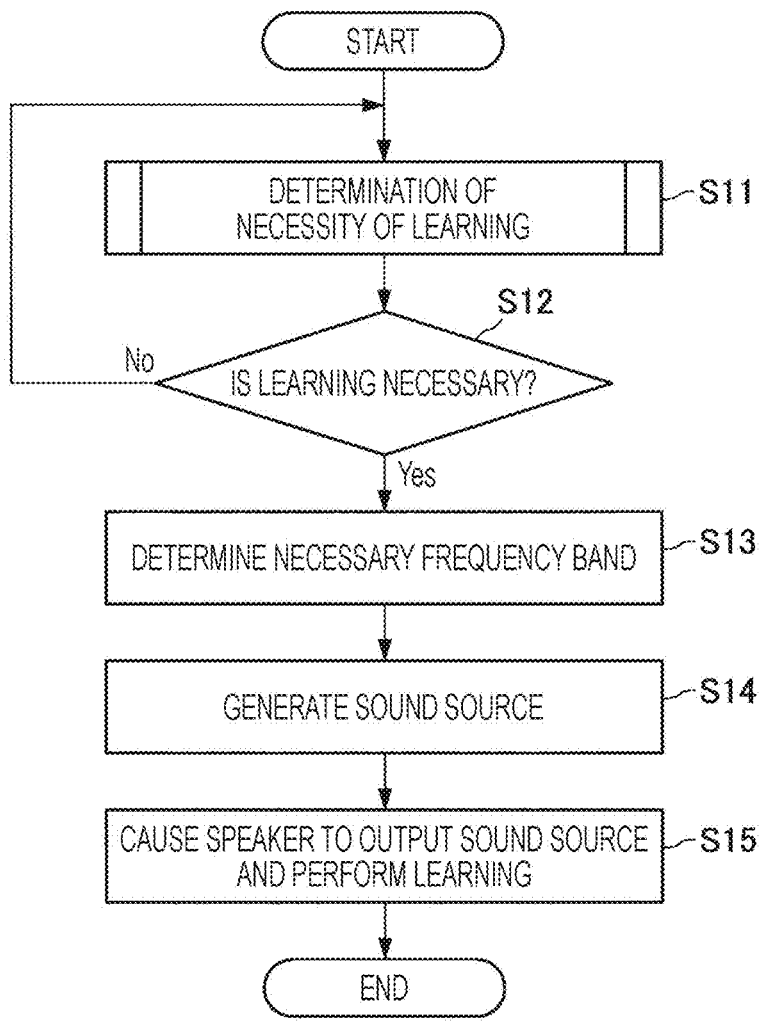
FIG. 14 is a flowchart showing an overall processing flow of a user terminal according to the first embodiment of the present disclosure.

Next, an overall processing flow of the user terminal 10 described above will be described. FIG. 14 is a flowchart showing an overall processing flow of the user terminal 10 according to the first embodiment of the present disclosure. First, in the user terminal 10 according to the first embodiment of the present disclosure, the environmental change detection unit 143 determines the necessity of learning (whether or not learning is required) (S11), as shown in FIG. 14. For example, the environmental change detection unit 143 determines the necessity of learning (whether or not learning is required) for each frequency band on the basis of information such as an echo cancellation amount, an image sensed by a camera, and infrared light sensed by an infrared sensor.

In a case where the environmental change detection unit 143 determines that learning is necessary ("No" in S12), the echo canceler 142 shifts the operation to S11. Meanwhile, in a case where the environmental change detection unit 143 determines that learning is necessary ("Yes" in S12), the echo canceler 142 determines a frequency band for which learning is required (S13). Subsequently, the audio signal generation unit 141 generates a sound source including many components in the frequency band necessary for learning (S14). Then, the echo canceler 142 causes the speaker 170 to reproduce the generated sound source, and learns estimated transfer characteristics (S15). Thus, the overall processing of the user terminal 10 is terminated.

Figure 15:
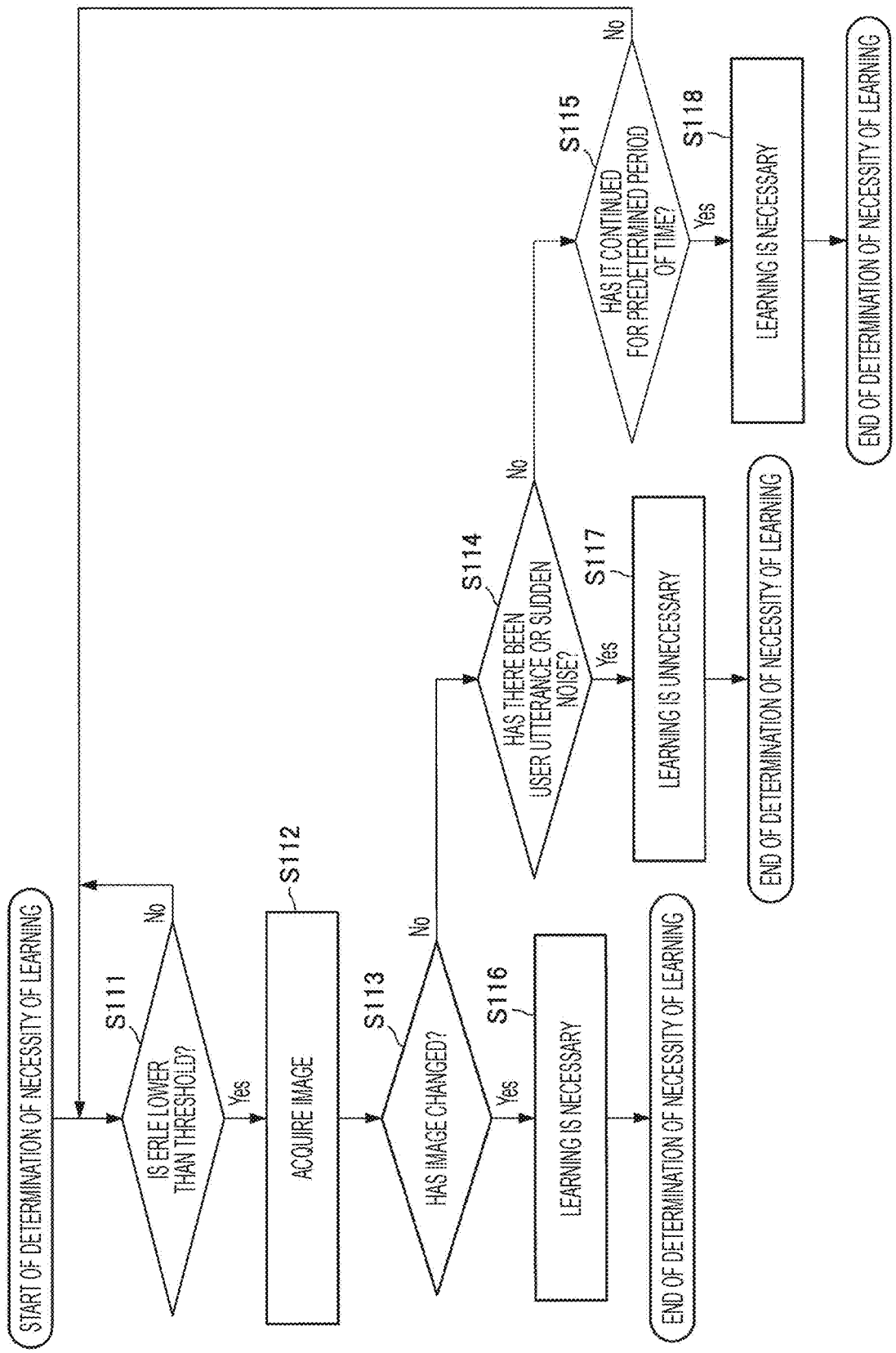
FIG. 15 is a flowchart showing a detailed flow of learning necessity determination.

FIG. 15 is a flowchart showing a detailed flow of learning necessity determination S11. As shown in FIG. 15, the environmental change detection unit 143 checks the value of ERLE while the sound is being reproduced by the speaker 170 (S111). The environmental change detection unit 143 acquires an image sensed by a camera in a case where the value of ERLE is lower than a threshold (S112). Then, the environmental change detection unit 143 determines whether or not there is a change in, for example, the arrangement of people or furniture and the like according to whether or not the image shows a predetermined level of change (S113). Note that infrared light sensed by an infrared sensor may be used for such determination instead of or in addition to the image.

In a case where the environmental change detection unit 143 determines that there is a change ("Yes" in S113), it is considered that the value of ERLE has decreased due to a change in the transfer characteristics of the space. Thus, it is determined that the learning of estimated transfer characteristics is necessary (S116). Meanwhile, in a case where the image does not show a predetermined level of change ("No" in S113) and it is determined that the decrease in the value of ERLE has not been caused by a change in the arrangement of people or furniture, it is considered that there is another cause of the decrease in the value of ERLE.

For example, a decrease in the value of ERLE may be caused by a user utterance, sudden noise, or the like ("Yes" in S114). In such a case, the value of ERLE is expected to return to a large value again when the utterance is ended or the noise source is stopped. This is because the transfer characteristics themselves of the space have not changed. Thus, the environmental change detection unit 143 determines that learning is unnecessary (S117).

Meanwhile, it is difficult to determine whether or not learning is necessary in a case where although the value of ERLE has decreased, a predetermined level of change has not been detected from the image or infrared light (no movement of an object has been detected) and there has been no user utterance or noise ("No'" in S114). In such a case, the environmental change detection unit 143 may monitor the value of ERLE. Then, in a case where the value of ERLE has continued to be lower than a predetermined threshold for a predetermined period of time ("Yes" in S115), the environmental change detection unit 143 may determine that learning is necessary (S118). Meanwhile, in a case where the value of ERLE has not continued to be lower than the predetermined threshold for the predetermined period of time ("No" in S115), the environmental change detection unit 143 may shift the operation to S111.

Note that even if it is determined that learning is actually necessary, a user may find it troublesome that the sound for learning is automatically reproduced by the speaker 170 immediately every time. Therefore, it is also possible to adopt a configuration in which even if it is determined that learning is necessary, a user or the user terminal 10 can select the timing at which learning is actually performed.

That is, in a case where the echo canceler 142 detects that the learning of estimated transfer characteristics is insufficient, the echo canceler 142 may notify a user, via the output unit 180, that the learning of estimated transfer characteristics is insufficient. At this time, it is sufficient if the echo canceler 142 causes the speaker 170 to reproduce a sound for learning in a case where an environmental change is detected and an instruction to reproduce the sound for learning is received.

4. SECOND EMBODIMENT

Hereinafter, the second embodiment of the present disclosure will be described. In the first embodiment of the present disclosure, a case has been mainly described in which a sound for learning estimated transfer characteristics (speaker reproduction sound source) is selected from among several candidates in accordance with an internal state. However, sound sources are prepared in advance. Therefore, the sound sources do not always meet the preference of a user. In the second embodiment of the present disclosure, a mechanism will be described in which a sound source that matches the user's preference is used for automatic learning with reference to user information.

Figure 16:
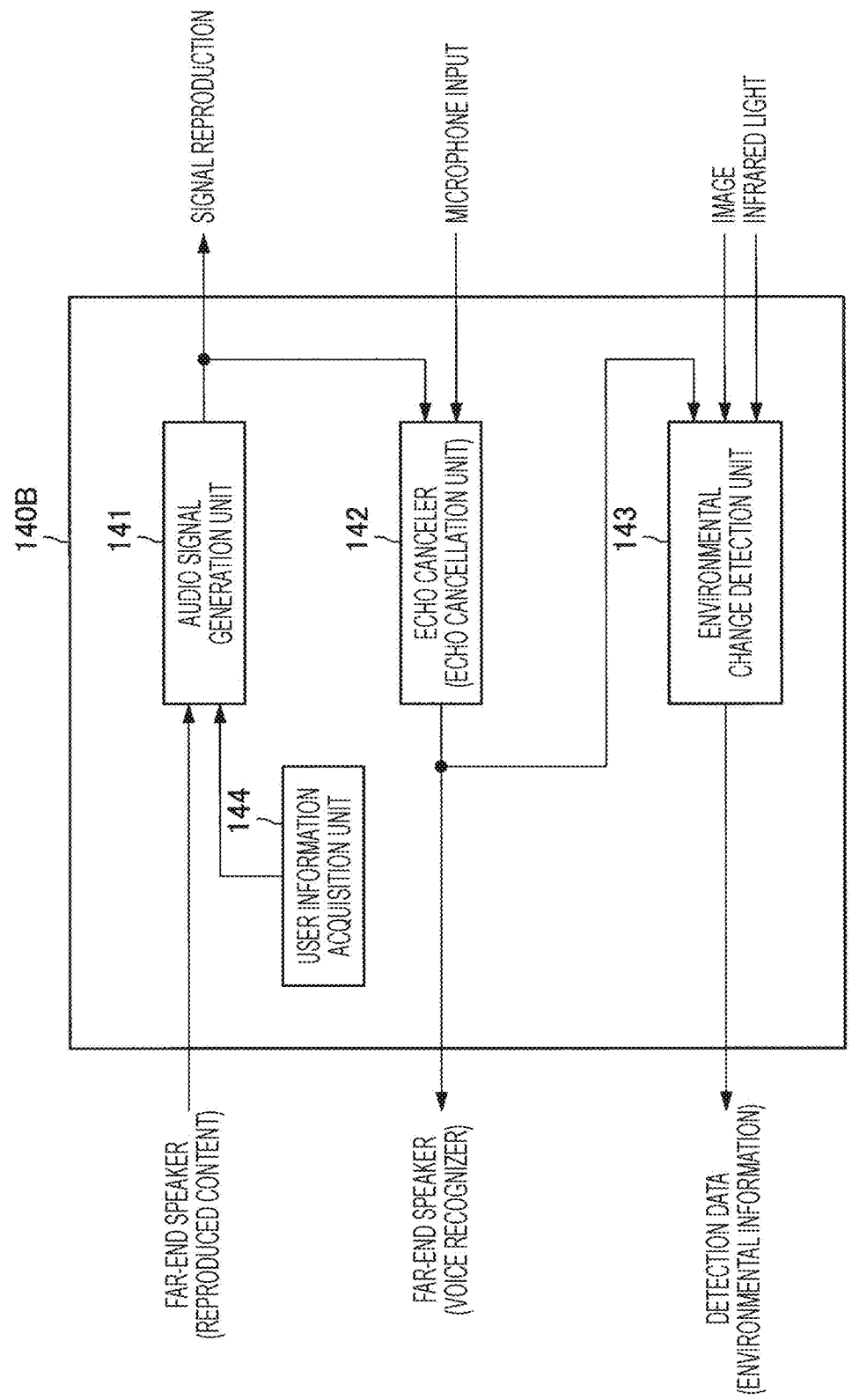
FIG. 16 is a diagram showing a detailed configuration example of a control unit according to a second embodiment of the present disclosure.

FIG. 16 is a diagram showing a detailed configuration example of a control unit 140B according to the second embodiment of the present disclosure. As shown in FIG. 16, the control unit 140B according to the second embodiment of the present disclosure includes an audio signal generation unit 141, an echo canceler (echo cancellation unit) 142, and an environmental change detection unit 143, as with the control unit 140A according to the first embodiment of the present disclosure. In addition, the control unit 140B according to the second embodiment of the present disclosure includes a user information acquisition unit 144.

Hereinafter, the function of each block will be described in more detail, focusing on the function of the user information acquisition unit 144.

(4.1. Automatic Generation of Sound for Learning)

In the second embodiment of the present disclosure, the storage unit 150 stores user information for each reproduction time zone. Examples of the user information include the genre, tune (melody line, or the like), tempo, volume (reproduction volume), and the like of music (music piece) that is usually reproduced by the user terminal 10 equipped with the echo canceler 142 used by a user. As a result, corresponding music is associated with the user information in advance. Accordingly, the user information acquisition unit 144 can acquire information indicating music that matches the user's preference.

FIG. 17 is a diagram showing an example of user information. User information can be configured as shown in FIG. 17. Note that user information can also be held for each user in a case where an individual who uses the user terminal 10 can be identified by, for example, the state of user's login to an application or the like provided in the user terminal 10, personal recognition based on an image sensed by a camera, personal identification by voice operation, or the like.

Next, in the case of detecting a frequency band for which the performance of the echo canceler 142 cannot be sufficiently exhibited, the environmental change detection unit 143 determines which frequency band needs to be mainly learned. The audio signal generation unit 141 generates a speaker reproduction sound source that matches the user's preference (or is close to the user's preference) and is suitable for automatic learning by the echo canceler 142, in accordance with the user information acquired in advance by the user information acquisition unit 144.

For example, assumed is a case where it is determined that it is necessary to learn the estimated transfer characteristics of a low frequency band and the genre of a music piece that is usually reproduced for the user (a music piece that matches the user's preference) is rock music. In such a case, it is preferable that a sound source including a lot of low-band sound be generated by the audio signal generation unit 141. This is because low-frequency band sound is often found in rock music.

Meanwhile, it is also possible to assume a case where the genre of the music piece that is usually reproduced for the user (the music piece that matches the user's preference) is orchestral music, while it is necessary to learn the estimated transfer characteristics of a low frequency band. High-frequency band sound is often found in orchestral music. Thus, in such a case, it is preferable to achieve both user's preference and learning efficiency by interweaving such high-frequency band sound with low-frequency band sound on an infrequent basis by use of other instrument sounds to increase reproduction time while emphasizing the melody of orchestral music.

FIG. 18 is a diagram showing examples of types of frequency band for which estimated transfer characteristics are to be learned. As shown in FIG. 18, examples of the types of frequency band for which estimated transfer characteristics are to be learned include a specific frequency, a plurality of frequencies, a low band, a middle band, a high band, a middle band or lower, a middle band or higher, a low band+a high band, and the like. As described above, there may be many variations in the type of frequency band for which learning is required, along with the user information (FIG. 17).

There is no limitation on a method for determining what kind of sound source should be reproduced for each combination of the type of frequency band for which learning is required and the user information. For example, the melody line and speed of a music piece that matches the user's preference may be determined in advance on the basis of the user information, and the frequency band of the music piece may be controlled by a change of a selected instrument. Alternatively, what kind of sound source should be reproduced may be determined by use of an automatic generator such as that to be used for machine learning.

As described above, a sound including a signal in a predetermined frequency band for which estimated transfer characteristics are to be learned by the echo canceler 142 may be a sound including a music piece that meets the user's preference. At this time, the sound including a signal in the predetermined frequency band may be a sound including a music piece selected from among one or a plurality of music pieces prepared in advance according to the user's preference, or may be a sound including a music piece generated by voice synthesis according to the user's preference.

Alternatively, the sound including a signal in the predetermined frequency band for which estimated transfer characteristics are to be learned by the echo canceler 142 may be a sound including a music piece to be reproduced by the speaker on the basis of a user operation. Furthermore, the sound including a signal in the predetermined frequency band for which estimated transfer characteristics are to be learned by the echo canceler 142 may be a sound including a sound generated by voice synthesis.

(4.2. Overall Flow)

Figure 19:
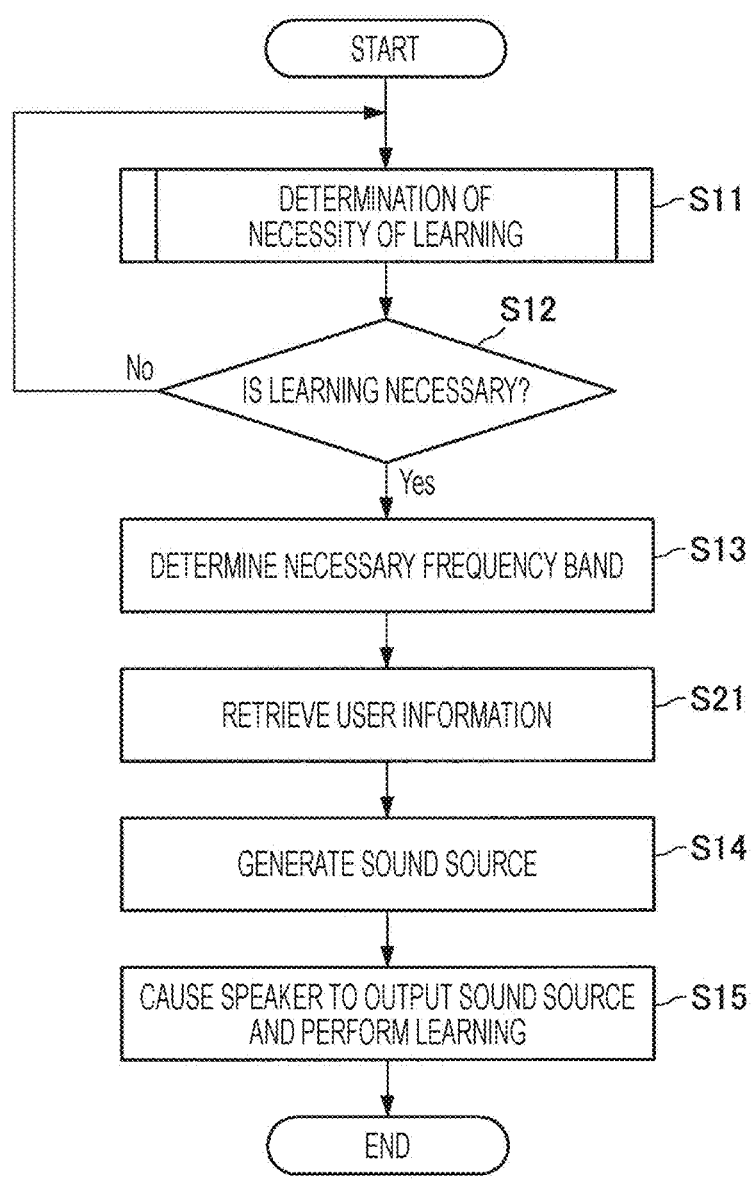
FIG. 19 is a flowchart showing an overall processing flow of a user terminal according to the second embodiment of the present disclosure.

Next, an overall processing flow of the user terminal 10 described above will be described. FIG. 19 is a flowchart showing an overall processing flow of the user terminal 10 according to the second embodiment of the present disclosure. As shown in FIG. 19, S11 to S13 are performed in the user terminal 10 as in the first embodiment of the present disclosure. Next, the user information acquisition unit 144 retrieves user information, and acquires information such as a tune and a genre that matches the user's preference (or is close to the user's preference). These pieces of information are used for generating a sound source in S14.

5. EXAMPLE OF HARDWARE CONFIGURATION

Figure 20:
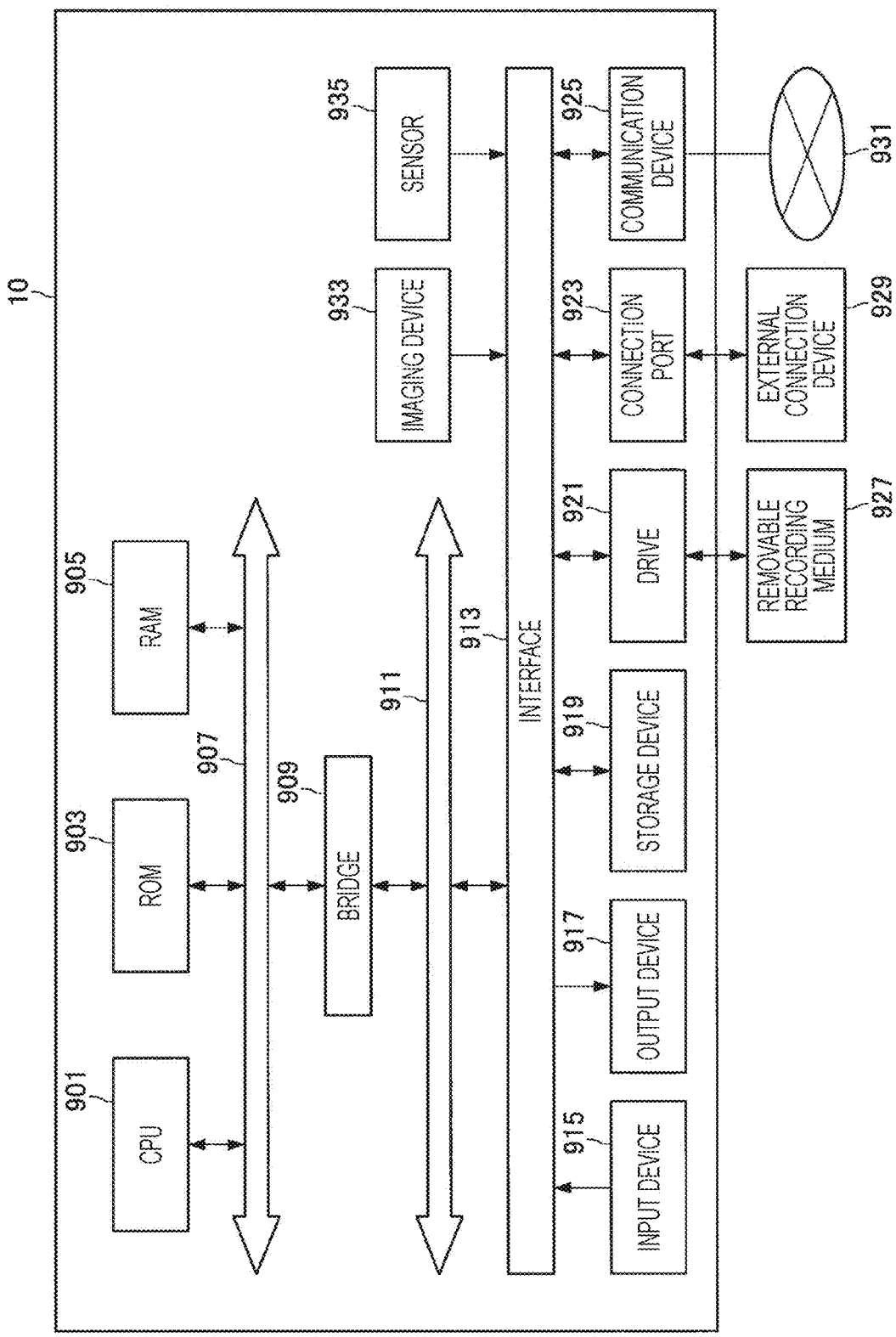
FIG. 20 is a block diagram showing a hardware configuration example of a signal processing apparatus according to the embodiments of the present disclosure.

Next, a hardware configuration of a signal processing apparatus (user terminal) 10 according to the embodiments of the present disclosure will be described with reference to FIG. 20. FIG. 20 is a block diagram showing a hardware configuration example of the signal processing apparatus 10 according to the embodiments of the present disclosure.

As shown in FIG. 20, the signal processing apparatus 10 includes a central processing unit (CPU) 901, a read only memory (ROM) 903, and a random access memory (RAM) 905. Furthermore, the signal processing apparatus 10 may include a host bus 907, a bridge 909, an external bus 911, an interface 913, an input device 915, an output device 917, a storage device 919, a drive 921, a connection port 923, and a communication device 925. Moreover, the signal processing apparatus 10 may include an imaging device 933 and a sensor 935 as necessary. The signal processing apparatus 10 may include a processing circuit such as that called a digital signal processor (DSP) or an application specific integrated circuit (ASIC) instead of or together with the CPU 901.

The CPU 901 functions as an arithmetic processing device and a control device, and controls overall operation or a part thereof in the signal processing apparatus 10 in accordance with various programs recorded in the ROM 903, the RAM 905, the storage device 919, or a removable recording medium 927. The ROM 903 stores programs, operation parameters, and the like to be used by the CPU 901. The RAM 905 temporarily stores, for example, programs to be used for causing the CPU 901 to perform control, parameters that appropriately change while the control is performed, and the like. The CPU 901, the ROM 903, and the RAM 905 are interconnected by the host bus 907 that includes an internal bus such as a CPU bus. Moreover, the host bus 907 is connected to the external bus 911 such as a Peripheral Component Interconnect/Interface (PCI) bus via the bridge 909.

The input device 915 includes devices to be operated by a user, such as a mouse, a keyboard, a touch panel, buttons, switches, and levers, for example. The input device 915 may include a microphone that detects the user's voice. The input device 915 may be, for example, a remote control device that uses infrared light or other radio waves, or may be an external connection device 929 such as a mobile phone that responds to the operation of the signal processing apparatus 10. The input device 915 includes an input control circuit that generates an input signal on the basis of information input by a user and outputs the input signal to the CPU 901. The user inputs various data to the signal processing apparatus 10 or instructs the signal processing apparatus 10 to perform a processing operation, by operating the input device 915. Furthermore, the imaging device 933 to be described later can also function as an input device by imaging a user's hand movement, a user's finger, and the like. At this time, a pointing position may be determined according to the movement of the hand or the direction of the finger.

The output device 917 includes a device that can notify a user of acquired information in a visual or auditory manner. For example, the output device 917 may be a display device, such as a liquid crystal display (LCD), a plasma display panel (PDP), an organic electro-luminescence (EL) display, or a projector, a hologram display device, sound output devices such as a speaker and headphones, a printer device, and the like. The output device 917 outputs a result obtained by the processing of the signal processing apparatus 10 as a screen image such as a text or an image, or outputs the result as a sound such as voice or acoustics. Furthermore, the output device 917 may include a light such as a light-emitting diode (LED).

The storage device 919 is a device for storing data, configured as an example of a storage unit of the signal processing apparatus 10. The storage device 919 includes, for example, a magnetic storage device such as a hard disk drive (HDD), a semiconductor storage device, an optical storage device, a magneto-optical storage device, or the like. The storage device 919 stores, for example, programs to be executed by the CPU 901, various data to be used by the CPU 901, various data acquired from the outside, and the like.

The drive 921 is a reader/writer for the removable recording medium 927 such as a magnetic disk, an optical disk, a magneto-optical disk, or a semiconductor memory. The drive 921 is built into the signal processing apparatus 10, or provided as an external device to be attached to the signal processing apparatus 10. The drive 921 reads information recorded in the mounted removable recording medium 927, and outputs the read information to the RAM 905. Furthermore, the drive 921 writes a record to the mounted removable recording medium 927.

The connection port 923 is a port for directly connecting a device to the signal processing apparatus 10. The connection port 923 may be, for example, a universal serial bus (USB) port, an IEEE 1394 port, a small computer system interface (SCSI) port, or the like. Furthermore, the connection port 923 may be an RS-232C port, an optical audio terminal, a high-definition multimedia interface (HDMI) (registered trademark) port, or the like. Connecting the external connection device 929 to the connection port 923 may enable exchanges of various data between the signal processing apparatus 10 and the external connection device 929.

The communication device 925 is a communication interface including, for example, a device for communication to be used for connecting to a communication network 931 and the like. The communication device 925 may be, for example, a communication card for wired or wireless local area network (LAN), Bluetooth (registered trademark), wireless USB (WUSB), or the like. In addition, the communication device 925 may be, for example, a router for optical communication, a router for asymmetric digital subscriber line (ADSL), a modem for various kinds of communication, or the like. For example, the communication device 925 transmits and receives signals and the like over the Internet or to and from another communication device by using a predetermined protocol such as TCP/IP. Furthermore, the communication network 931 connected to the communication device 925 is a network connected in a wired or wireless manner. Examples of the communication network 931 include the Internet, a home LAN, infrared communication, radio wave communication, satellite communication, and the like, for example.

For example, the imaging device 933 is a device that images real space to generate a captured image by using various members. Examples of the various members include an imaging element, such as a charge coupled device (CCD) or a complementary metal oxide semiconductor (CMOS), a lens for controlling formation of a subject image on the imaging element, and the like. The imaging device 933 may be a device that captures a still image, or may be a device that captures a moving image.

For example, the sensor 935 includes various sensors such as a distance measuring sensor, an acceleration sensor, a gyro sensor, a geomagnetic sensor, a vibration sensor, an optical sensor, and a sound sensor. For example, the sensor 935 obtains information regarding the state of the signal processing apparatus 10 itself, such as the position of the housing of the signal processing apparatus 10, and information regarding the surrounding environment of the signal processing apparatus 10, such as brightness and noise around the signal processing apparatus 10. Furthermore, the sensor 935 may include a global positioning system (GPS) sensor that receives a GPS signal and measures the latitude, longitude, and altitude of a device.

6. CONCLUSION

As described above, according to the embodiments of the present disclosure, when the performance of a normal echo canceler is deteriorated, the deterioration is automatically detected and learning is performed. In a case where the performance is deteriorated in some of frequency bands for each of which an estimated transfer characteristic is held, there is reproduced a speaker reproduction sound source that enables the some frequency bands to be efficiently learned. As a result, it is possible to cause an echo canceler to perform the learning of estimated transfer characteristics at high speed.

Furthermore, for example, information indicating music that is usually reproduced for a user, and the like is held in advance. Thus, a sound source with the tune that meets the user's taste is automatically generated such that the sound source includes many frequency components that require learning. This enables the user to enjoy the effect of alleviating user's discomfort caused by a sound automatically generated by a device. Moreover, if the reproduction sound source changes every time depending on user information or a frequency band in which the performance of the echo canceler is insufficient, it is less likely to give the user the impression that this is simple automatic adjustment of the device.

7. EXAMPLE

An example of the above-described embodiments of the present disclosure will be described. When transfer characteristics between a speaker and a microphone change and the amount of echo cancellation decreases due to, for example, a change in the arrangement of furniture in the room, an object placed near a device, or the like, the device automatically plays music and correction starts such that an echo canceler sufficiently functions.

In a case where a user changes the arrangement of a device including a stationary speaker and microphone, call quality and the performance of voice recognition deteriorate when the device initially reproduces sound through the speaker. This is because the performance of the echo canceler is insufficient. Alternatively, it is possible to recognize a change in environment by detecting a change in own position from information such as a camera image also before sound is reproduced by a speaker. It is also possible to prepare a sound source which enables all frequency bands to be learned such that a frequency band which is difficult to learn is detected while the sound source is reproduced by a speaker and the sound source is changed during the reproduction in a case where an environmental change is detected.

Music is automatically stopped when the progress of the learning of each frequency band can be detected during the reproduction by the speaker and it is determined that the learning has progressed as a whole to a level where the performance is not affected. Even music that is comfortable for a user may provide the user with a sense of discomfort when suddenly reproduced. Therefore, it is also possible to provide in advance notification to the user by causing a voice to be reproduced by a display device or a speaker.

Furthermore, even without providing time intended exclusively for automatic learning, it is also possible to naturally perform learning during normal use by a user as if a device naturally started singing when the device dialogically reproduces a voice as with Text to Speech (TTS) or while overlapping as background music.

8. MODIFICATION

The preferred embodiments of the present disclosure have been described above in detail with reference to the accompanying drawings. However, the technical scope of the present disclosure is not limited to such examples. It will be apparent to those skilled in the art of the present disclosure that various changes or modifications can be conceived within the scope of the technical idea described in the claims. It is understood that, of course, such changes or modifications are also within the technical scope of the present disclosure.

For example, it is also possible to create a program for causing hardware such as a CPU, a ROM, and a RAM incorporated in a computer to exhibit functions equivalent to the functions of the control unit 140 described above. Furthermore, a computer-readable recording medium on which the program has been recorded can also be provided.

Mainly described above are cases where the audio signal generation unit 141, the echo cancellation unit 142, and the environmental change detection unit 143 are incorporated in the user terminal (signal processing apparatus) 10. However, some of these functions may be incorporated in a device different from the user terminal (signal processing apparatus) 10. For example, the audio signal generation unit 141 may be incorporated in a device (for example, a server or the like) different from the user terminal (signal processing apparatus) 10.

Furthermore, the effects described in the present specification are merely explanatory or illustrative, and not restrictive. That is, the technology according to the present disclosure can achieve other effects obvious to those skilled in the art from descriptions in the present specification, together with or instead of the above-described effects.

Note that the following configurations are also within the technical scope of the present disclosure.

(1)

A signal processing apparatus including:

an echo cancellation unit that learns an estimated transfer characteristic in a space through which a signal reproduced by a speaker is input to a microphone, and performs echo cancellation on the basis of the estimated transfer characteristic learned; and an environmental change detection unit that detects an environmental change, in which the echo cancellation unit learns the estimated transfer characteristic by causing the speaker to reproduce a sound for learning on the basis of detection of the environmental change.

(2)

The signal processing apparatus according to (1) above, in which the environmental change detection unit detects an insufficiency of the learning of the estimated transfer characteristic, as the environmental change.

(3)

The signal processing apparatus according to (2) above, in which the environmental change detection unit detect the insufficiency of the learning of the estimated transfer characteristic on the basis that an echo cancellation amount based on the estimated transfer characteristic learned by the echo cancellation unit is lower than a predetermined threshold.

(4)

The signal processing apparatus according to any one of (1) to (3) above, in which the environmental change detection unit detects the environmental change on the basis of detection data regarding environment.

(5)

The signal processing apparatus according to (4) above, in which the detection data includes data for notifying the environmental change or sensing data.

(6)

The signal processing apparatus according to (5) above, in which the sensing data are derived from sensing by at least any one of a camera, an infrared sensor, an ultrasonic sensor, an acceleration sensor, a gyro sensor, a laser sensor, a vibration sensor, or a GPS sensor.

(7)

The signal processing apparatus according to any one of (1) to (6) above, in which the echo cancellation unit learns the estimated transfer characteristic for each frequency band.

(8)

The signal processing apparatus according to any one of (1) to (7) above, in which the sound for learning is white noise.

(9)

The signal processing apparatus according to any one of (1) to (7) above, in which the sound for learning is a sound including a signal in a predetermined frequency band for which the estimated transfer characteristic is to be learned by the echo cancellation unit.

(10)

The signal processing apparatus according to (9) above, in which the signal in the predetermined frequency band is determined on the basis of an echo cancellation amount for each frequency band.

(11)

The signal processing apparatus according to (9) or (10) above, in which the sound including the signal in the predetermined frequency band is a sound including a music piece that meets a user's preference.

(12)

The signal processing apparatus according to (11) above, in which the sound including the signal in the predetermined frequency band is a sound including a music piece selected from among one or a plurality of music pieces prepared in advance according to the user's preference.

(13)

The signal processing apparatus according to (11) above, in which the sound including the signal in the predetermined frequency band is a sound including a music piece generated by voice synthesis according to the user's preference.

(14)

The signal processing apparatus according to (9) or (10) above, in which the sound including the signal in the predetermined frequency band is a sound including a music piece to be reproduced by the speaker on the basis of a user operation.

(15)

The signal processing apparatus according to (9) or (10) above, in which the sound including the signal in the predetermined frequency band is a sound including a sound generated by voice synthesis.

(16)

The signal processing apparatus according to any one of (1) to (15) above, further including:

an audio signal generation unit that generates the sound for learning.

(17)

The signal processing apparatus according to any one of (1) to (16) above, in which in a case where it is detected that the learning of the estimated transfer characteristic is insufficient, the echo cancellation unit notifies a user, via an output unit, that the learning of the estimated transfer characteristic is insufficient.

(18)

The signal processing apparatus according to any one of (1) to (17) above, in which the echo cancellation unit causes the speaker to reproduce the sound for learning on the basis of detection of the environmental change and an instruction to reproduce the sound for learning.

(19)

A signal processing method including:

learning an estimated transfer characteristic in a space through which a signal reproduced by a speaker is input to a microphone, and performing echo cancellation on the basis of the estimated transfer characteristic learned;

detecting an environmental change; and causing a processor to learn the estimated transfer characteristic by causing the speaker to reproduce a sound for learning on the basis of detection of the environmental change.

(20)

A program for causing a computer to function as a signal processing apparatus that includes:

an echo cancellation unit that learns an estimated transfer characteristic in a space through which a signal reproduced by a speaker is input to a microphone, and performs echo cancellation on the basis of the estimated transfer characteristic learned; and an environmental change detection unit that detects an environmental change, in which the echo cancellation unit learns the estimated transfer characteristic by causing the speaker to reproduce a sound for learning on the basis of detection of the environmental change.

REFERENCE SIGNS LIST

1 Information processing system
10 User terminal (signal processing apparatus)
90 Network
110 Input unit
120 Microphone
130 Sensor unit
140 Control unit
141 Audio signal generation unit
142 Echo canceler (echo cancellation unit)
143 Environmental change detection unit
144 User information acquisition unit
150 Storage unit
160 Communication unit
170 Speaker
180 Output unit

The invention claimed is:

1. A signal processing apparatus, comprising:
an echo cancellation unit configured to:
learn an estimated transfer characteristic in a space through which a signal reproduced by a speaker is input to a microphone; and
perform echo cancellation based on the learned estimated transfer characteristic; and
an environmental change detection unit configured to:
detect an insufficiency of the learning of the estimated transfer characteristic based on an echo cancellation amount that is lower than a threshold value, wherein the echo cancellation amount is based on the estimated transfer characteristic learned by the echo cancellation unit; and
detect the insufficiency of the learning of the estimated transfer characteristic as an environmental change, wherein
the echo cancellation unit is further configured to:
cause the speaker to reproduce a sound for learning based on the environmental change; and
learn the estimated transfer characteristic based on the reproduced sound for learning.

2. The signal processing apparatus according to claim 1, wherein the environmental change detection unit is further configured to detect the environmental change based on detection data regarding environment.

3. The signal processing apparatus according to claim 2, wherein the detection data includes data to notify the environmental change or sensing data.

4. The signal processing apparatus according to claim 3, wherein the sensing data are derived from sensing by at least one of a camera, an infrared sensor, an ultrasonic sensor, an acceleration sensor, a gyro sensor, a laser sensor, a vibration sensor, or a global positioning system (GPS) sensor.

5. The signal processing apparatus according to claim 1, wherein the echo cancellation unit is further configured to learn the estimated transfer characteristic for each frequency band.

6. The signal processing apparatus according to claim 1, wherein the sound for learning is white noise.

7. The signal processing apparatus according to claim 1, wherein the sound for learning is a sound including a signal in a determined frequency band for which the estimated transfer characteristic is to be learned by the echo cancellation unit.

8. The signal processing apparatus according to claim 7, wherein the signal in the determined frequency band is determined based on an echo cancellation amount for each frequency band.

9. The signal processing apparatus according to claim 7, wherein the sound including the signal in the determined frequency band is a sound including a music piece that meets a user's preference.

10. The signal processing apparatus according to claim 9, wherein the sound including the signal in the determined frequency band is a sound including a music piece selected from among a plurality of music pieces prepared in advance based on the user's preference.

11. The signal processing apparatus according to claim 9, wherein the sound including the signal in the determined frequency band is a sound including a music piece generated by voice synthesis based on the user's preference.

12. The signal processing apparatus according to claim 7, wherein the sound including the signal in the determined frequency band is a sound including a music piece to be reproduced by the speaker based on a user operation.

13. The signal processing apparatus according to claim 7, wherein the sound including the signal in the determined frequency band is a sound including a sound generated based on voice synthesis.

14. The signal processing apparatus according to claim 1, further comprising an audio signal generation unit configured to generate the sound for learning.

15. The signal processing apparatus according to claim 1, wherein
based on the detection of the insufficiency of the learning of the estimated transfer characteristic, the echo cancellation unit is further configured to notify a user, via an output unit, the insufficiency of the learning of the estimated transfer characteristic.

16. The signal processing apparatus according to claim 1, wherein the echo cancellation unit is further configured to cause the speaker to reproduce the sound for learning based on the environmental change and an instruction to reproduce the sound for learning.

17. A signal processing method, comprising:
learning an estimated transfer characteristic in a space through which a signal reproduced by a speaker is input to a microphone;
performing echo cancellation based on the learned estimated transfer characteristic;
detecting an insufficiency of the learning of the estimated transfer characteristic based on an echo cancellation amount that is lower than a threshold value, wherein the echo cancellation amount is based on the learned estimated transfer characteristic;
detecting the insufficiency of the learning of the estimated transfer characteristic as an environmental change;
causing the speaker to reproduce a sound for learning based on the environmental change; and
learning the estimated transfer characteristic based on the reproduced sound for learning.

18. A non-transitory computer-readable medium having stored thereon computer-executable instructions, that when executed by a processor, cause the processor to execute operations, the operations comprising:
learning an estimated transfer characteristic in a space through which a signal reproduced by a speaker is input to a microphone;
performing echo cancellation based on the learned estimated transfer characteristic;
detecting an insufficiency of the learning of the estimated transfer characteristic based on an echo cancellation amount that is lower than a threshold value, wherein the echo cancellation amount is based on the learned estimated transfer characteristic;
detecting the insufficiency of the learning of the estimated transfer characteristic as an environmental change;
causing the speaker to reproduce a sound for learning based on the environmental change; and
learning the estimated transfer characteristic based on the reproduced sound for learning.

19. A signal processing apparatus, comprising:
an echo cancellation unit configured to:
learn an estimated transfer characteristic in a space through which a signal reproduced by a speaker is input to a microphone; and
perform echo cancellation based on the learned estimated transfer characteristic; and
an environmental change detection unit configured to detect an environmental change, wherein
the echo cancellation unit is further configured to:
cause the speaker to reproduce a sound for learning based on the environmental change;
learn the estimated transfer characteristic based on the reproduced sound for learning; and
notify a user, via an output unit, an insufficiency of the learning of the estimated transfer characteristic.

\* \* \* \* \*